US012627068B2

(12) United States Patent
Kumagai et al.

(10) Patent No.: US 12,627,068 B2
(45) Date of Patent: May 12, 2026

(54) RADIO WAVE CONTROL SYSTEM

(71) Applicant: AGC Inc., Tokyo (JP)

(72) Inventors: Akira Kumagai, Tokyo (JP); Keisuke Arai, Tokyo (JP); Osamu Kagaya, Tokyo (JP); Yasuo Morimoto, Tokyo (JP)

(73) Assignee: AGC Inc., Tokyo (JP)

( * ) Notice: Subject to any disclaimer, the term of this patent is extended or adjusted under 35 U.S.C. 154(b) by 169 days.

(21) Appl. No.: 18/410,065

(22) Filed: Jan. 11, 2024

(65) Prior Publication Data

US 2024/0145937 A1 May 2, 2024

Related U.S. Application Data

(63) Continuation of application No. PCT/JP2022/027614, filed on Jul. 13, 2022.

(30) Foreign Application Priority Data

Jul. 19, 2021 (JP) ................................ 2021-119125

(51) Int. Cl.
*H01Q 19/10* (2006.01)
*H01Q 19/06* (2006.01)

(52) U.S. Cl.
CPC ........... *H01Q 19/104* (2013.01); *H01Q 19/06* (2013.01)

(58) Field of Classification Search
CPC ........ H01Q 19/104; H01Q 19/06; H01Q 3/46; H01Q 15/002; H01Q 15/148; H01Q 19/065; H01Q 1/1271
See application file for complete search history.

(56) References Cited

U.S. PATENT DOCUMENTS

| | | | |
|---|---|---|---|
| 5,963,172 A | 10/1999 | Pfizenmaier et al. | |
| 11,456,775 B2 * | 9/2022 | Ng | H01Q 15/0013 |
| 11,811,140 B2 * | 11/2023 | Balakrishnan | H01Q 3/46 |
| 2002/0101390 A1 | 8/2002 | Takeuchi et al. | |
| 2007/0104072 A1 | 5/2007 | Ogata | |
| 2018/0040962 A1 * | 2/2018 | Lee | H01Q 15/147 |
| 2019/0246457 A1 | 8/2019 | Aoki et al. | |
| 2023/0327321 A1 * | 10/2023 | Sekiguchi | H01Q 15/14 343/702 |
| 2025/0174903 A1 | 5/2025 | Miyazaki et al. | |

FOREIGN PATENT DOCUMENTS

| | | |
|---|---|---|
| JP | 2-121401 A | 5/1990 |
| JP | 11-504756 A | 4/1999 |
| JP | 2002-237717 A | 8/2002 |
| JP | 4556143 B2 | 10/2010 |
| JP | 4618725 B2 | 1/2011 |
| JP | 4632103 B2 | 2/2011 |
| JP | WO-2018/079386 A1 | 8/2019 |
| JP | 2023-550917 A | 12/2023 |
| JP | 2024-69354 A | 5/2024 |
| WO | WO-2022/108899 A1 | 5/2022 |

* cited by examiner

*Primary Examiner* — Dimary S Lopez Cruz
*Assistant Examiner* — Austin M Back
(74) *Attorney, Agent, or Firm* — Oblon, McClelland, Maier & Neustadt, L.L.P.

(57) ABSTRACT

A radio wave control system includes a phase adjustment plate that transmits a radio wave from a second main surface to a first main surface and focuses the radio wave on a focal point; and a reflection plate installed at a position irradiated with the radio wave transmitted through the phase adjustment plate.

13 Claims, 24 Drawing Sheets

| | CASE WHERE REFLECTION PLATE IS INSTALLED ON FOCAL POINT OF PHASE ADJUSTMENT PLATE | CASE WHERE REFLECTION PLATE IS INSTALLED SO THAT ENTIRE REFLECTION SURFACE IS IRRADIATED WITH LIGHT COLLECTED BY PHASE ADJUSTMENT PLATE |
|---|---|---|
| RECEPTION AND TRANSMISSION POWER OF REFLECTION PLATE ($P_r$) | $P_r = \frac{\{\mathrm{Ave}[\lvert E_f \rvert]\}^2}{\zeta} A$ | $P_r = p_{RIS} A = \frac{\{\mathrm{Ave}[\lvert E \rvert]\}^2}{\zeta} A \approx \frac{k^2 \lvert E_0 \rvert^2}{\zeta} S$ |
| RADIATION POWER DENSITY AT POINT SEPARATED FROM REFLECTION PLATE BY $r$ ($p_{rad}$) | $p_{rad} = \frac{1}{\lambda^2 r^2} \frac{1}{\zeta} \left[ \int_{RIS} dS \, \lvert E_f \rvert \right]^2 = \frac{1}{\lambda^2 r^2} \frac{\{\mathrm{Ave}[\lvert E_f \rvert]\}^2}{\zeta} A$ | $p_{rad} = \frac{1}{\lambda^2 r^2} \frac{1}{\zeta} \left[ \int_{RIS} dS \, \lvert E \rvert \right]^2 = \frac{1}{\lambda^2 r^2} \frac{\{\mathrm{Ave}[\lvert E \rvert]\}^2}{\zeta} A$ |
| DEGREE OF IMPROVEMENT OF ELECTRIC FIELD STRENGTH BY PHASE ADJUSTMENT PLATE | $\frac{\mathrm{Ave}[\lvert E_f \rvert]}{\mathrm{Ave}[\lvert E_0 \rvert]}$ | $\frac{\mathrm{Ave}[\lvert E \rvert]}{\mathrm{Ave}[\lvert E_0 \rvert]}$ |

$S$ : AREA OF ELECTRIC POWER HALF VALUE PLANE
$A$ : AREA OF REFLECTION PLATE
$E_0$ : ELECTRIC FIELD STRENGTH WITHOUT PHASE ADJUSTMENT PLATE
$E_f$ : ELECTRIC FIELD STRENGTH AT FOCAL POINT OF PHASE ADJUSTMENT PLATE
$E$ : ELECTRIC FIELD STRENGTH PASSED THROUGH PHASE ADJUSTMENT PLATE
$\zeta$ : IMPEDANCE OF VACUUM
$\Lambda$ : WAVELENGTH OF ELECTROMAGNETIC WAVE THROUGH AIR

FIG.13

ELECTRIC FIELD STRENGTH ON CIRCUMFERENCE OF RADIUS OF 1 m FROM RIS AS CENTER [dBV/m]

ELECTRIC FIELD STRENGTH ON CIRCUMFERENCE OF RADIUS OF 1 m FROM RIS AS CENTER [dBV/m]

ELECTRIC FIELD STRENGTH ON CIRCUMFERENCE OF RADIUS OF 1 m FROM RIS AS CENTER [dBV/m]

FIG.20

| Incident wave | RIS position | Amplification degree of electric field on circumference of radius of 1 m from RIS | Electric power integrated value within $\phi$100 | Half value region | (P × S)/(P0 × S0) | $Ave[\|E\|]/Ave[\|E_0\|]$ |
|---|---|---|---|---|---|---|
| With phase adjustment plate (df=1 m) | 1.3 m | +0.6 dBV/m =1.07 | 1.7 (4.6 dB) | $\phi$90 | 1.91 (2.8 dB) | 4.6 dB (1.7) |
| | 1.0 m (focal point) | −2.0 dBV/m =0.79 | 1.8 (5.3 dB) | $\phi$22 | 0.13 (−8.9 dB) | 1.6 dB (1.2) |
| Plane wave (without phase adjustment plate) | – | −2.9 dBV/m =0.71 | 1 | – | 1 (0 dB) | 0 dB (1) |

RADIO WAVE CONTROL SYSTEM

CROSS-REFERENCE TO RELATED APPLICATION

The present application is a continuation application of International Application No. PCT/JP2022/027614, filed Jul. 13, 2022, which claims priority to Japanese Patent Application No. 2021-119125 filed Jul. 19, 2021. The contents of these applications are incorporated herein by reference in their entirety.

BACKGROUND OF THE INVENTION

1. Field of the Invention

The present invention relates to a radio wave control system for controlling radio waves for wireless communication.

2. Description of the Related Art

Conventionally, there has been known a configuration in which an antenna or a bundled body is provided outdoors or on a window in order to improve reception performance of radio waves indoors. For example, Japanese unexamined patent application publication No. 2002-237717 proposes an antenna device in which a bundled body is provided on an indoor side of a window to concentrate radio waves, thereby improving reception performance of radio waves indoors.

SUMMARY OF THE INVENTION

Problems to be Solved by the Invention

In the bundled body described in Japanese unexamined patent application publication No. 2002-237717, electric power can be concentrated at an indoor focal point, but there is no effect of concentrating radio waves at places other than the indoor focal point.

Therefore, when an electronic device such as a smartphone or a laptop computer is used indoors at different positions or plural electronic devices are used at plural positions at the same time, the reception performance of the electronic devices may deteriorate.

The present disclosure provides a radio wave control system capable of improving radio wave intensity in a wide range.

Means for Solving the Problem

According to an aspect of the present disclosure, a radio wave control system including a phase adjustment plate that transmits a radio wave from a second main surface to a first main surface and focuses the radio wave on a focal point; and a reflection plate installed at a position irradiated with the radio wave transmitted through the phase adjustment plate, is provided.

Effects of the Invention

According to the present disclosure, it is possible to improve radio wave intensity in a wide range in a radio wave control system.

BRIEF DESCRIPTION OF THE DRAWINGS

Other objects and further features of the present disclosure will be apparent from the following detailed description when read in conjunction with the accompanying drawings, in which:

FIG. 13 is a table showing the theoretical formula of a power reflected from the reflection plate;

FIG. 20 is a table showing an electric field amplification factor, a power integral value, a half-power diameter, and an area ratio at a peripheral radius of 1 m around the reflection plate in the calculation model;

DESCRIPTION OF THE EMBODIMENT

Figure 1:
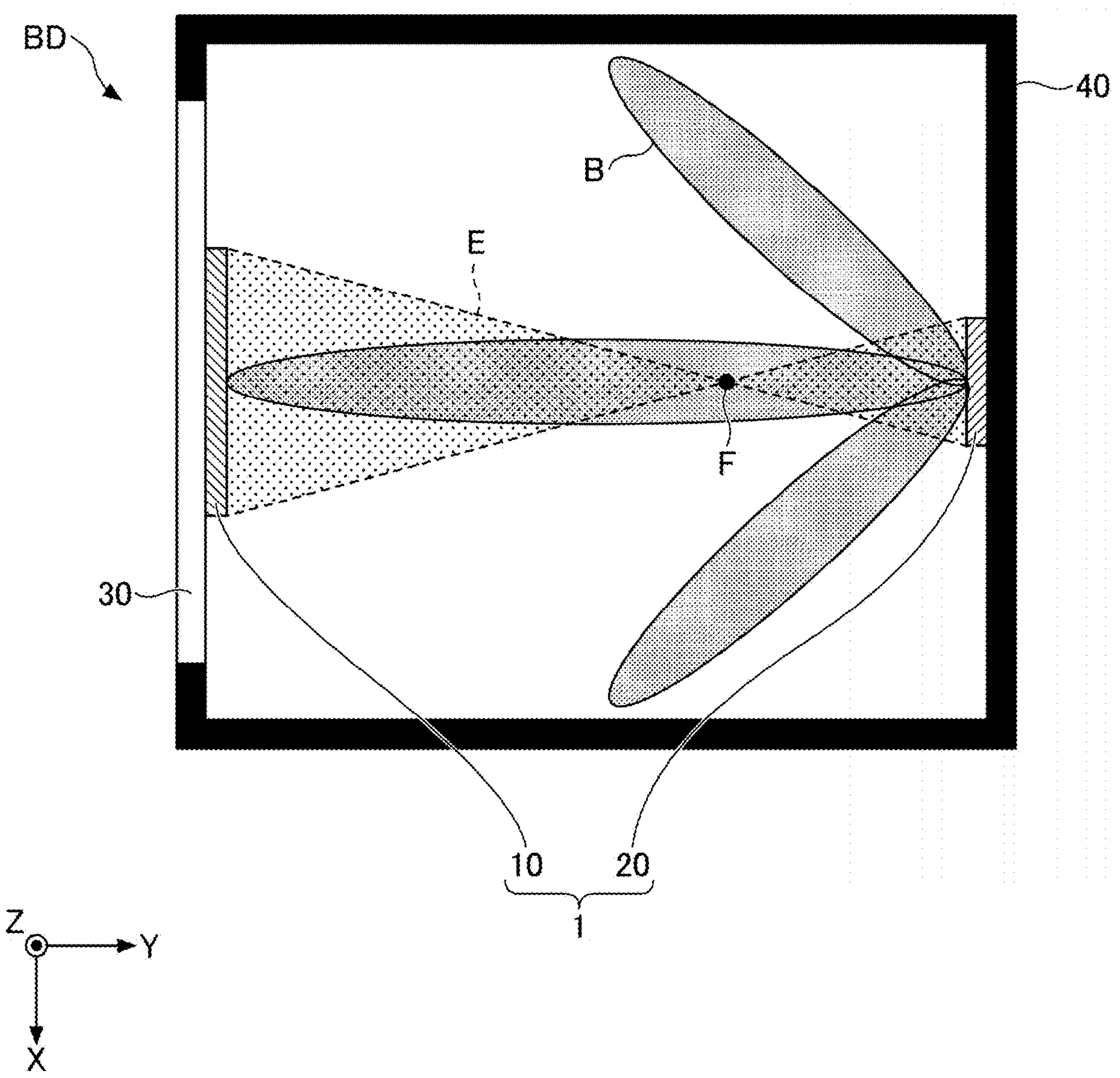
FIG. 1 is a diagram schematically illustrating a radio wave control system according to a first embodiment of the present invention.

Hereinafter, embodiments of the present invention will be described with reference to the drawings. For ease of understanding, a scale of each member in the drawings may be different from the actual scale. In directions such as parallel, right angle, orthogonal, horizontal, vertical, up-down, left-right, and the like, deviations are allowed to such an extent that functions and effects of the embodiment are not impaired. A shape of a corner portion is not limited to a right angle and may be rounded in an arcuate shape. Parallel, perpendicular, orthogonal, horizontal, and vertical may include substantially parallel, substantially perpendicular, substantially orthogonal, substantially horizontal, and substantially vertical.

In this specification, a three dimensional orthogonal coordinate system having three axis directions (an X-axis direction, a Y-axis direction, and a Z-axis direction) will be used, and a width direction of a wall is defined as the X-axis direction, a height direction of the wall is defined as the Z-axis direction, and a thickness direction of the wall is defined as the Y-axis direction. A direction from the bottom to the top of the wall is defined as a +Z-axis direction, and the opposite direction is defined as a −Z-axis direction. A direction from the outdoors to the indoors is taken as a +Y-axis direction, and the opposite direction is taken as a −Y-axis direction. In the following description, the +Z-axis direction may be referred to as an upper direction, the −Z-axis direction may be referred to as a lower direction, the +Y-axis direction may be referred to as an indoor side, and the −Y-axis direction may be referred to as an outdoor side.

The X-axis direction, the Y-axis direction, and the Z-axis direction represent a direction parallel to an X-axis, a direction parallel to a Y-axis, and a direction parallel to a Z-axis, respectively. The X-axis direction, the Y-axis direction, and the Z-axis direction are orthogonal to each other. An XY plane, a YZ plane, and a ZX plane represent a virtual plane parallel to the X-axis direction and the Y-axis direction, a virtual plane parallel to the Y-axis direction and the Z-axis direction, and a virtual plane parallel to the Z-axis direction and the X-axis direction, respectively.

In addition, in the following description, when “millimeter wave” or “millimeter wave band” is referred to, the quasi-millimeter wave band of 30 GHz to 300 GHz is also included in addition to the band of 24 GHz to 30 GHz. “Radio waves” are a kind of electromagnetic waves, and electromagnetic waves below 3 THz are generally called radio waves. Hereinafter, an electromagnetic wave radiated from an outdoor base station or a relay station will be referred to as a “radio wave”, and an electromagnetic wave in general will be referred to as an “electromagnetic wave”. In the drawings, the same elements are denoted by the same reference numerals, and redundant description may be omitted.

First Embodiment

FIG. 1 is a top view schematically illustrating a radio wave control system 1 according to a first embodiment. The radio wave control system 1 is a radio communication system for improving a communication environment of radio communication.

The radio wave control system 1 according to the first embodiment includes a phase adjustment plate 10 and a reflection plate 20. In the present embodiment, the phase adjustment plate 10 is provided on the glass plate 30. The glass plate 30 on which the phase adjustment plate 10 is disposed is not limited to a window glass of a building BD shown in FIG. 1, but may be a roof of a shelter of a bus stop or a shelter at a station platform, a rear glass of a car, or the like.

In the present embodiment, the reflection plate 20 is disposed on a wall 40 at a position to which a radio wave transmitted through the phase adjustment plate 10 is irradiated so that the main surface faces the phase adjustment plate 10. The wall 40 on which the phase adjustment plate 10 is disposed is not limited to a wall of the building BD but may be a wall of the shelter of the bus stop or the shelter at the station platform, a wall of a vehicle body, or the like, as long as the wall 40 is within a range where the radio wave transmitted through the phase adjustment plate 10 can reach.

Here, in general, the wall of the building BD serves as a shield for a radio wave in the millimeter wave band and does not allow the radio wave to pass therethrough or greatly attenuates the radio wave. Therefore, radio waves radiated from an outdoor base station enter indoors through a window glass instead of the wall. Since the radio wave transmitted through the glass plate 30 travels straight as it is, an area other than a line of sight (LOS) inside the building BD becomes a dead zone in which a communication environment is not good, and does not readily receive the radio wave.

Therefore, in the radio wave control system of the present embodiment, as shown in FIG. 1, the phase adjustment plate 10 is installed on the indoor side of the glass plate 30 of the building BD, and the reflection plate 20 is disposed indoors.

With this configuration, in the glass plate 30 on which the phase adjustment plate 10 is installed, radio waves radiated from, for example, an outdoor base station BS (see FIG. 3) and incident on the glass plate 30 are concentrated at a predetermined focal point F. In the present embodiment, by disposing the reflection plate 20 at the focal point F or at a predetermined position in the vicinity of the focal point F inside the building BD, the reflection plate 20 can reflect a radio wave having a high energy density in a desired direction. As a result, the communication environment can be improved in the area where the reflected radio wave reaches indoors.

The phase adjustment plate 10 provided on the glass plate 30 is, for example, a Fresnel zone plate lens (FZPL), a dielectric lens, or a frequency-selective plate.

The reflection plate 20 is, for example, a reflection plate whose reflection angle is electrically changeable, and includes, for example, an active reflection plate, a reconfigurable intelligent surface (RIS), or a metasurface reflection plate. The reflection plate 20 is set at an angle, other than specular reflection, so that radio waves are reflected by the reflection plate 20 in a desired direction. Alternatively, the reflection plate 20 may be a reflection plate that reflects light at a fixed angle other than specular reflection.

Here, it is preferable that the radio wave controlled by the radio wave control system 1 is a millimeter wave band of a fifth generation mobile communication system (5G) or the like, or having a frequency of 1 to 30 GHz including Sub-6. Alternatively, the radio wave to be controlled may be Long Term Evolution (LTE), LTE-Advanced (LTE-A), Ultra Mobile Broadband (UMB), IEEE802.11 (Wi-Fi (Trademark Registered)), IEEE802.16 (WiMAX (Trademark Registered)), IEEE802.20, Ultra-Wideband (UWB), Bluetooth (Trademark Registered), or Low Power Wide Area (LPWA). The radio wave may be utilized in any communication system, such as other enhanced communication systems. As the frequency increases, propagation loss due to reflection or diffraction increases, and such a dead zone is likely to occur. Therefore, the radio wave control system 1 of the present invention is more suitable for communication that handles a relatively high frequency.

(Phase Adjustment Plate)

Figure 2:
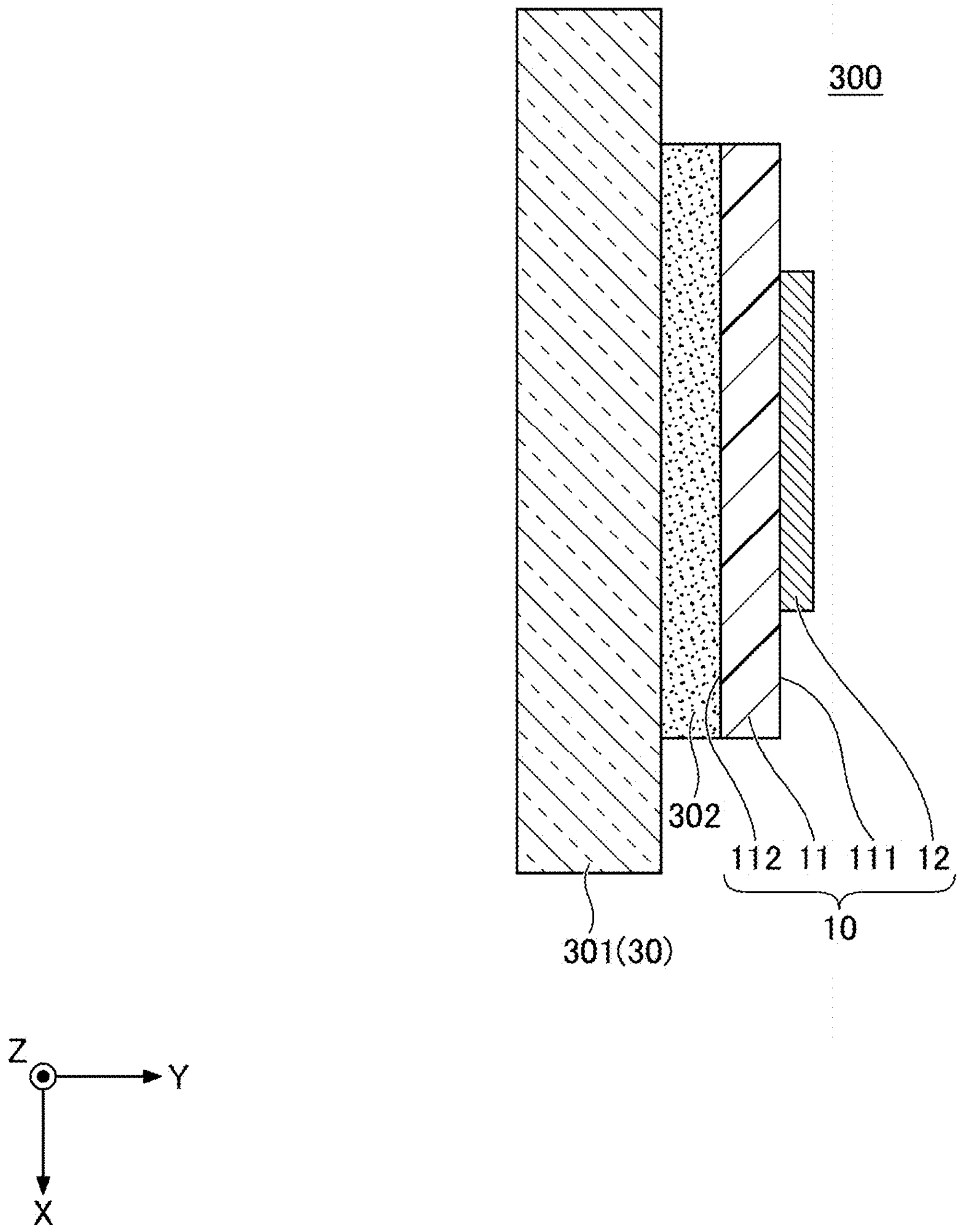
FIG. 2 is a cross-sectional view of a glass plate with a phase adjustment plate according to the first embodiment.

FIG. 2 is a schematic view of the glass plate 300 with the phase adjustment plate according to the first embodiment. The phase adjustment plate 10 is attached to the glass substrate 301 of the glass plate 30 with an adhesive layer 302.

The phase adjustment plate 10 includes a substrate 11 having a first main surface 111 and a second main surface 112 opposite each other, and a conductive pattern 12 provided on the first main surface 111 of the substrate 11. Here, the "main surface" is a surface orthogonal to the thickness direction of the substrate 11. The substrate 11 transmits the electromagnetic wave incident from the second main surface 112 to the first main surface 111.

The substrate 11 is formed of any material that is transparent to electromagnetic waves at the operating frequency of the radio wave control system 1 and that can carry the conductive pattern 12. "Transparent" means that the transmittance is 60% or more, preferably 70% or more, more preferably 80% or more, and still more preferably 90% or more. As an example, a resin base material is used for the substrate 11. As the resin material satisfying the above conditions, an acrylic resin such as polymethyl methacrylate, a cycloolefin-based resin, or a polycarbonate-based resin can be used.

From the viewpoint of application to the glass plate 30, the conductive pattern 12 is preferably formed of a transparent conductive film such as zinc oxide (ZnO), tin oxide ($SnO_2$), tin-doped indium oxide (ITO), or indium zinc oxide (IZO). According to the application subject, the conductive pattern may be formed of a metal thin film, such as copper, nickel, or gold. In the case of the metal thin film, it is preferable to form the metal thin film in a mesh form from the viewpoint of visibility.

The glass substrate 301 may be made of generally available glass, such as soda-lime glass, alkali-free glass, aluminosilicate glass, Pyrex (registered trademark) glass, or quartz glass. The adhesive layer 302 is formed of any adhesive material which is transparent to the electromagnetic wave of the operating frequency of the radio wave control system 1 and can bond the glass substrate 301 and the substrate 11 of the phase adjustment plate 10. The meaning of "transparent" of the adhesive layer 302 is the same as the meaning of "transparent" of the substrate 11. When the glass plate 30 is used as a window glass, the entire glass plate 300 to which the phase adjustment plate is attached may be transparent to visible light.

FIGS. 1 and 2 show a configuration in which the phase adjustment plate 10 is formed separately from the glass plate and attached to the glass substrate 301 with the adhesive layer 302, but the phase adjustment plate 10 and the glass plate 30 may be integrated to form a phase adjustment plate-mounted glass plate. Alternatively, the conductive film may be formed on the first main surface 111 of the substrate 11 after attaching the substrate 11 onto the glass substrate 301 via the adhesive layer 302, and the conductive pattern 12 may be formed by photolithography and etching.

The conductive pattern 12 formed on the first main surface 111 of the substrate 11 forms a metasurface. "Metasurface" refers to an artificial surface that controls the transmission and reflection characteristics of incident electromagnetic waves. By controlling a phase, an amplitude, or both of the electromagnetic wave incident on the conductive pattern, it is also possible to realize optical characteristics that do not exist in nature. Incident electromagnetic waves can be transmitted, reflected, or condensed (focused) in a desired direction by the conductive pattern 12.

Figure 3:
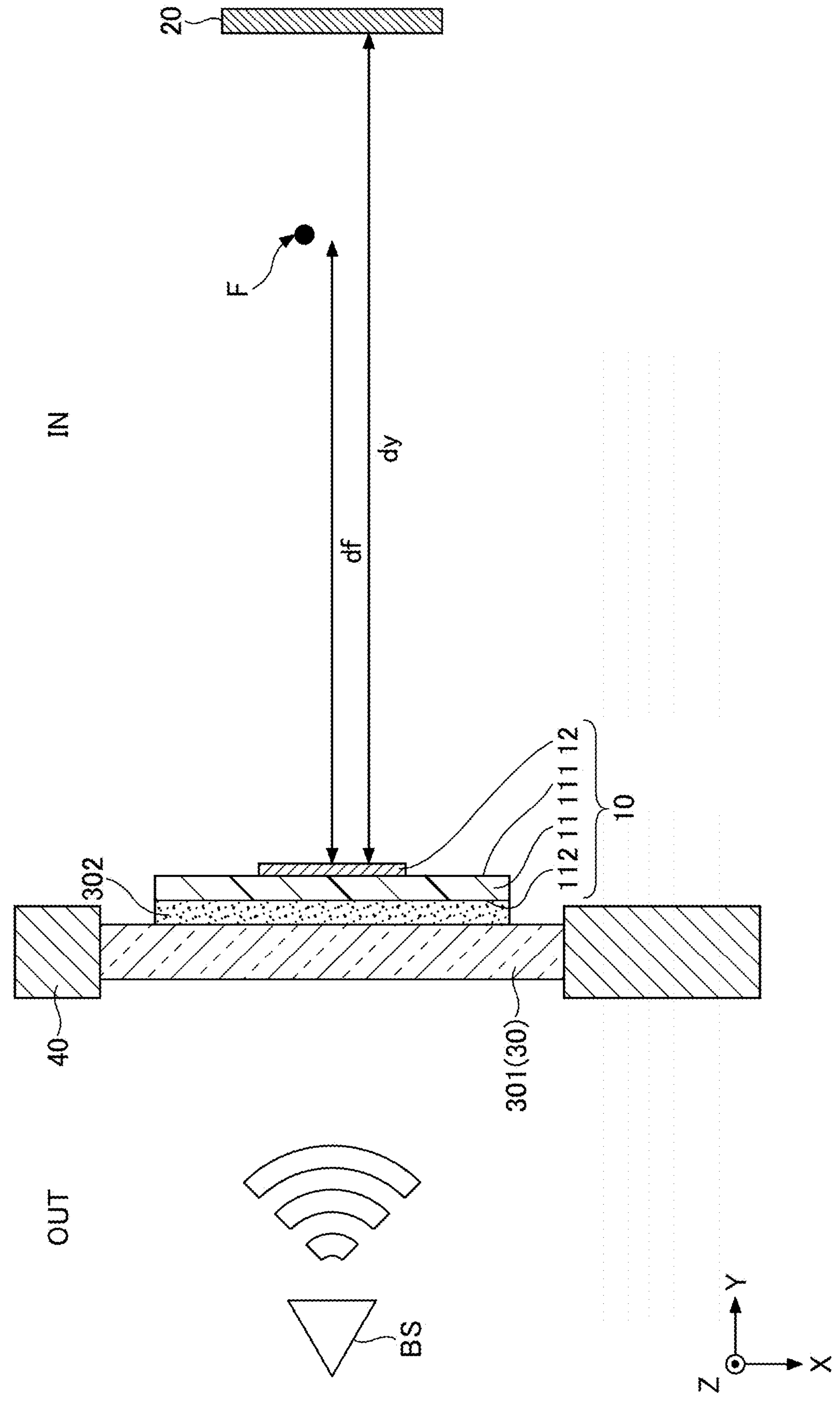
FIG. 3 is a diagram for explaining an operation principle of the radio wave control system according to the first embodiment.

FIG. 3 is a top view illustrating the operation principle of the radio wave control system 1. A glass plate 30 is inserted into the wall 40. It is assumed that a height direction of the wall 40 is a Z-direction, a direction from the wall 40 toward the indoor IN is a Y-direction, and a direction orthogonal to the Z-direction and the Y-direction is an X-direction. The glass plate 30 is arranged so that the conductive pattern 12 faces the indoor IN.

Therefore, in the present embodiment, as shown in FIGS. 1 and 3, the phase adjustment plate 10 and the reflection plate 20 are disposed so as to face each other, and the main surface of the phase adjustment plate 10 and the main surface of the reflection plate 20 are in a parallel positional relationship.

Radio waves radiated from the base station BS in the outdoor OUT are incident on the glass plate 30, for example, from a direction perpendicular to the glass plate 30. The incident radio wave is transmitted through the glass plate 30 and the phase adjustment plate 10, and is focused at a focal point F at a distance df from the first main surface 111 by the conductive pattern 12 on the first main surface 111 of the phase adjustment plate 10. By disposing the reflection plate 20 at such a position of the focal point F or disposing at a position near the focal point F and at a distance dy from the first main surface 111, it is possible to reflect by the reflection plate the radio wave that is focused and has an increased energy density.

Here, in the present embodiment, in the glass plate 30 of the building BD, the height from the ground when the phase adjustment plate 10 is provided is preferably 1 to 14 m, and particularly preferably 2 to 10 m, in terms of efficiency of radio waves.

In the present embodiment, on the wall 40 of the building BD, the reflection plate 20 is provided in the same room as the room in which the phase adjustment plate 10 is provided, and the height of the reflection plate 20 from the ground is preferably 1 to 14 m, and particularly preferably 2 to 10 m in terms of the efficiency of radio waves.

Figure 4:
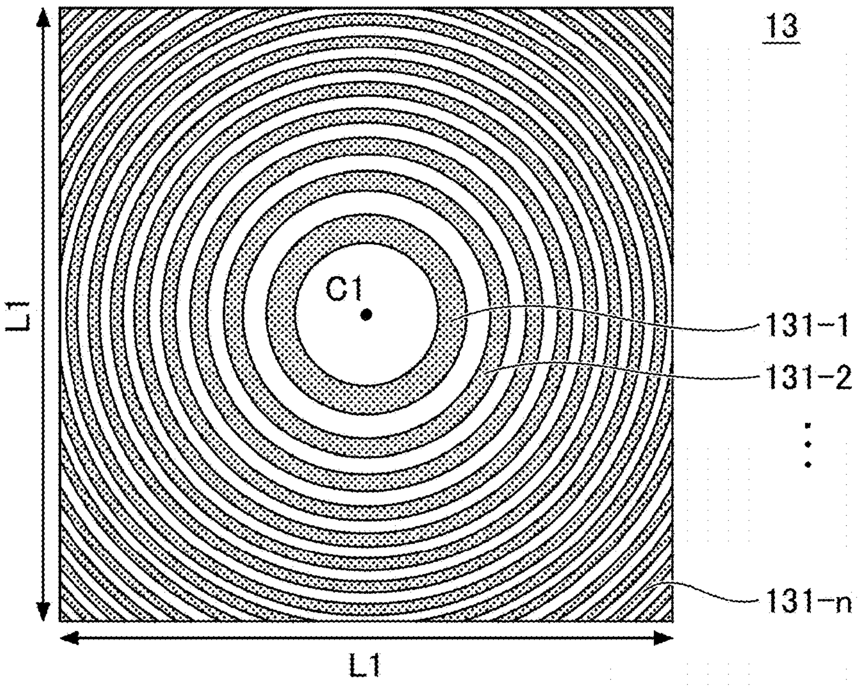
FIG. 4 is a diagram showing an example of a conductive pattern provided on the phase adjustment plate according to the first embodiment.

FIG. 4 shows a light condensing pattern 13 included in the conductive pattern 12 of the phase adjustment plate 10. The light condensing pattern 13 is an example of a second pattern forming the conductive pattern 12.

The conductive pattern may further have a periodic pattern (unit cell pattern) therein. A pattern size is determined in accordance with a target frequency. The unit cell pattern is repeated to generate a periodic structure, thereby functioning as a resonator for resonating an electromagnetic wave of the target frequency. The shape of the periodic pattern is, for example, a rectangular shape, a cross shape, or a ring shape.

The light condensing pattern 13 shown in FIG. 4 is a Fresnel lens pattern formed by concentric circles 131-1 to **131-*n* around the center C1. Since the cross-sectional views of FIGS. 2 and 3 are schematic views, the continuous conductive pattern 12 on the substrate 11 is shown. However, more specifically, as a Fresnel lens pattern configuration, regions that transmit radio waves and conductor regions that reflect (shield) radio waves are periodically arranged in accordance with the wavelength of the radio waves to be focused. Specifically, in the light condensing pattern 13, annular shielding portions (also referred to as conductive portions or reflective portions) 131-1 to 131-*n* and annular transmissive portions are alternately provided concentrically around the center C1. In the concentric annular shielding portions 131-1 to 131-*n* which are the conductive patterns 12 formed of a transparent conductive film, the line widths of the concentric circles 131 become narrower and the intervals between the adjacent concentric circles 131 become narrower as the distances from the center C1 increase. In FIG. 4, concentric circles 131-1 to 131-*n***, which are planar patterns, realize lenses that are convex in the traveling direction of the electromagnetic wave.

The radius of the n-th concentric circle **131-*n*, rn, is obtained by the focal length of the light condensing pattern 13**, f, and the wavelength of the incident electromagnetic wave, λ, through the following relation.

[Math 1]

$$r_n^2 = nf\lambda \tag{1}$$

The size of the light condensing pattern 13 determined from the Equation (1), L1×L1, is larger than 2fλ×2fλ. The length 2fλ is a diameter of the first concentric circle. Equation (1) is an approximate expression when the number of rings is small. When the number of rings is sufficiently large, the radius $r_n$ can be determined based on Equation (2), shown below. When n is larger than 2, i.e., when a fifth or higher order Fresnel ring-shaped zone can be designed, higher accuracy can be obtained by using Equation (2).

[Math 2]

$$\sqrt{f^2 + r_n^2} - f = \frac{n\lambda}{2} \tag{2}$$

According to the repetition period of the unit cell pattern and the lens effect of the condensing pattern 13, electromagnetic waves of a predetermined frequency can be condensed at a desired position.

When the conductive pattern 12 shown in FIG. 4 is used, the distance df from the phase adjustment plate 10 to the focal point F shown in FIG. 3 is about 1000 mm. Here, the term "about" is intended to allow an error of about plus or minus several millimeters due to a manufacturing error, a measurement error, or the like. In the following description, the absence of "about" in a numerical value does not exclude tolerances.

The phase adjustment plate 10 configured as described above preferably has a size that includes fourth order or more (n is greater than or equal to 2) Fresnel ring-shaped zones, and more preferably has a size that includes sixth order or more (n is greater than or equal to 3) Fresnel ring-shaped zones.

(Variation of Phase Adjustment Plate)

FIG. 4 shows an example in which the phase adjustment plate 10 is provided with the planar conductive pattern 12 to form a Fresnel lens, but a phase compensation type Fresnel lens may be used as the phase adjustment plate 10. For example, the transmission phase may be adjusted by changing the thickness of the substrate at the concentric circles 131. Specifically, the desired effect can be achieved by increasing the thickness of the substrate by λg/2 at the concentric circle 131, where λg is a wavelength of a radio wave in the substrate. In addition, for example, the transmission phase may be adjusted by changing the dielectric constant of the substrate in the concentric circles 131. Furthermore, the dielectric constant and the thickness may be continuously delivered.

In the present invention, by placing the reflection plate 20 at the focal point F of the phase adjustment plate 10 or in the vicinity thereof, the condensed radio wave with an increased energy density can be reflected by the reflection plate 20, so that the power receiving area can be efficiently developed in the indoor IN.

Here, as an example, a method of adjusting the reflection angle in a case where the reflection plate 20 is an array with controllable directivity capable of adjusting a directivity of a beam, called a reconfigurable intelligent surface (RIS), will be described with reference to FIGS. 5 and 6.

Figure 5:
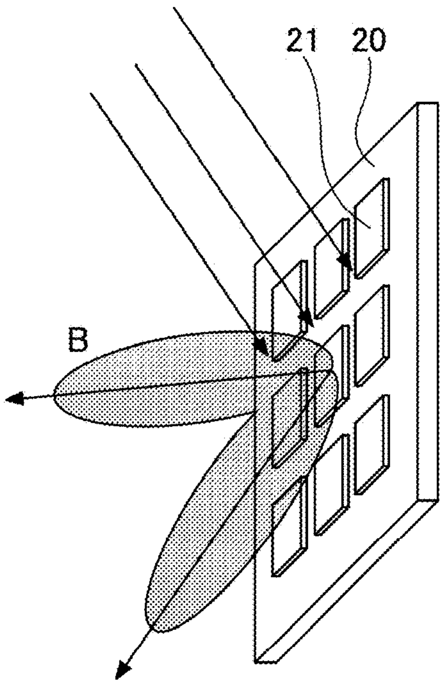
FIG. 5 is a diagram schematically illustrating a reflection angle when the reflection plate of the present invention is a reflect array.

FIG. 5 is a conceptual diagram of a reflection angle when the reflection plate of the present invention is a reflect array. FIG. 6 is an explanatory diagram of a mechanism for adjusting the reflection angle in each cell of the reflect array to which the radio wave transmitted through the phase adjustment plate is incident.

In the reflection plate 20 constituted by the reflect array shown in FIG. 5, the direction of the beam B which is a reflected radio wave is adjusted by changing the phase when the radio wave is reflected at each location, that is, at each cell 21 called a unit cell, and arranging the cells 21 in an array.

Specifically, each cell 21 is provided with a reflection element (not shown) capable of adjusting a reflection phase. Since the radio wave is obliquely incident on the outer side surface of the cell 21, the reflection phase is changed in one cell 21 by setting the phase difference of the radio wave reflected by the reflection element for each location in consideration of the inter-cell distance d (see FIG. 6). The direction of reflection can be changed as a whole by changing the reflection phase at each position of the plurality of cells 21.

FIG. 5 shows an example in which the reflection plate adjusts a reflection angle of a radio wave, polarized in one direction, incident from one direction. The reflection plate in the radio wave control system of the present invention can function as the RIS capable of adjusting the reflection angle of the radio wave for each of polarizations in two directions, the vertically polarized wave and the horizontally polarized wave. In other words, the reflection plate 20 of the present invention may be capable of adjusting the reflection angle of the radio wave with respect to linear polarization (vertical polarization and horizontal polarization) and circular polarization (left circular polarization and right circular polarization).

Here, in the configuration of the present invention, since the radio wave incident on the reflection plate 20 is the radio wave collected by the phase adjustment plate 10, the radio wave incident on the reflection plate 20 has such an angle as to be collected toward the focal point F, and the radio wave is not a plane wave but has a different incident angle and a different radio wave phase for each position of the cell 21.

Figure 6:
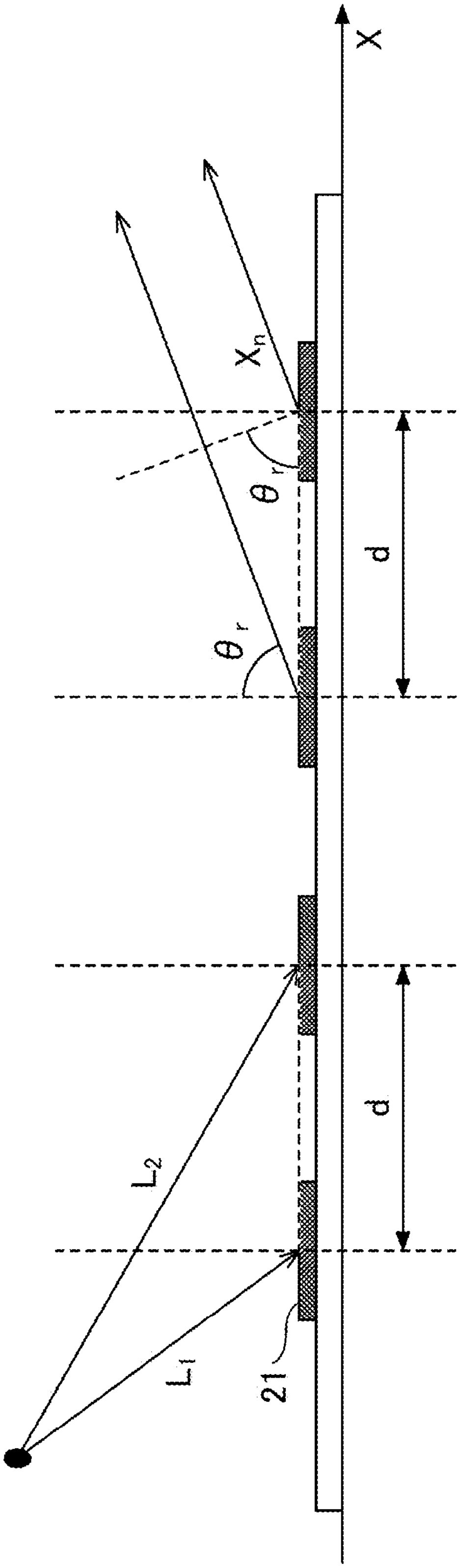
FIG. 6 is a diagram for explaining a mechanism for adjusting a reflection angle in each cell of the reflect array on which a radio wave transmitted through the phase adjustment plate is incident.

For example, as shown in FIG. 6, the reflection direction of the radio wave incident along the X-axis and transmitted through the phase adjustment plate 10 to be collected is changed by adding a phase at each location x of each cell 21 when the radio wave is reflected along the X-axis.

The phase $\phi_n$ of the incident wave on the n-th element with respect to the incident wave incident on the first element as a reference is expressed by the following Equation (3), assuming that the incident waves are spherical waves generated from a point-like wave source.

[Math 3]

$$\phi_n = k(L_n - L_1) \tag{3}$$

The expected phase of the reflected wave is expressed by the following Equation (4) with respect to the incident wave incident on the first element as a reference.

[Math 4]

$$x_n = (n-1)kd \sin \theta_r \tag{4}$$

Thus, the phase difference of the reflected wave on the n-th element with respect to the incident wave is obtained as Equation (5).

[Math 5]

$$\psi_n = x_n - \phi_n = (n-1)kd \sin \theta_r - k(L_n - L_1) \tag{5}$$

The case of the point wave source has been described above. When the incident wave is emitted from a wave source having a finite size as in the present embodiment, a phase $\phi_n$ at each point on the phase adjustment plate which is regarded as a point wave source may be integrated over the phase adjustment plate, and the obtained phase may be used. As described above, in the reflection plate 20 of the present invention, the reflection angle is set in consideration of the incident angle having a different phase for each position of the plurality of cells 21.

In this way, the radio wave control system 1 according to the present invention can change directions of beams of radio waves emitted from base stations or the like in the 5G to emit the beams in various directions or desired directions, or can form a multi-beam.

In FIG. 6, the case where the wave incident along the X-axis is reflected along the X-axis has been described. In the case where the wave is incident and reflected along the Y-axis or obliquely incident and reflected when viewed from the X-axis and the Y-axis, the reflection plate 20 of the present invention serves as a reflection plate capable of setting the reflection angle to an angle other than the specular reflection angle.

The RIS constituting the reflection plate 20 included in the radio wave control system 1 of the present invention may be a digital RIS that assigns the phase difference to one of a few separated values, e.g., two values or may be an analog RIS that varies the phase difference continuously. In addition, the RIS may be capable of electrically controlling the reflection direction, or may fix the reflection direction to a predetermined direction to reflect light.

As for the size of the reflection plate 20 of the present invention configured as described above, in the case where the reflection plate 20 has a quadrangle shape, one side is preferably 10λ or more and 40λ or less where λ is the wavelength of radio waves in the air. When the reflection plate 20 has a circular shape, the diameter thereof is preferably 10λ or more and 50λ or less.

Figure 7:
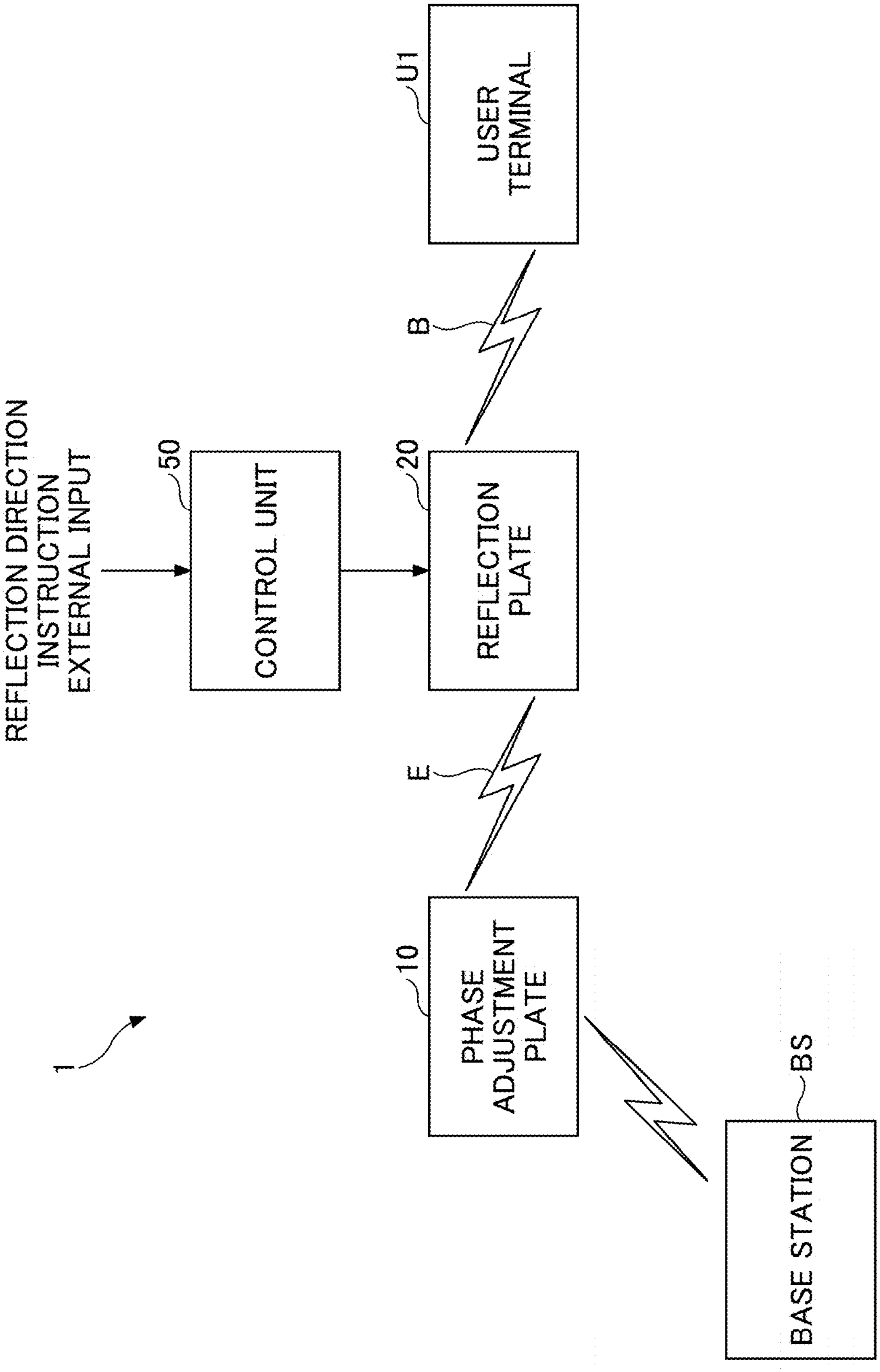
FIG. 7 is a schematic block diagram of the radio wave control system according to the first embodiment.

FIG. 7 is a schematic block diagram of the radio wave control system 1 according to the embodiment of the present invention.

As shown in FIG. 7, a controller 50 is connected to the reflection plate 20 of the present invention. The controller 50 of the present invention is realized by, for example, a microcomputer.

The controller 50 receives input of an incident wave source position (including an arrival direction of a plane wave by setting the position at infinity) and a reflection direction instruction (directivity instruction) from the outside, and controls each reflection angle of the plurality of cells 21 of the reflection plate 20. At this time, as shown in FIGS. 5 and 6, the controller 50 adjusts the reflection angle while adjusting the phase of the incident radio wave by the radio wave collected by the phase adjustment plate 10.

The controller 50 may be disposed on the wall 40 in the vicinity of the reflection plate 20, or may be disposed slightly away from the reflection plate 20, for example, on a ceiling or a floor. The input from the outside of the controller 50 is input from, for example, a management computer (not illustrated) that manages the building BD, or the user terminals U1. The controller 50 operates based on a power supply voltage generated by a power supply generator (not illustrated).

In the present embodiment, in the phase adjustment plate 10 installed on the window glass, for example, radio waves radiated from an outdoor base station BS and incident on the glass plate 30 are concentrated at a predetermined indoor focal point F. Then, the reflection plate 20 disposed in the focal point F or in a predetermined range in the vicinity of the focal point F inside the building BD changes the direction of the beam of the radio waves having a high energy density to emit the beam B in a specific direction or to form a multi-beam, thereby delivering the radio wave to a dead zone. Thus, by eliminating the dead zone of the radio wave indoors and improving the radio wave intensity in a wide range, the indoor user terminals U1 can establish communication with the outdoor user terminals and can acquire web sites and web page information on the Internet.

As shown in FIG. 7, for example, radio waves transmitted from outdoor user terminals and web sites and web page information on the Internet arrive at the base stations BS and can be received by the indoor user terminals U1 which were originally located in the dead zone via the phase adjustment plate 10 and the reflection plate 20 of the radio wave control system 1. The radio waves transmitted from the indoor user terminals U1 originally located in the dead zone can be transmitted to the base stations BS via the reflection plate 20 and the phase adjustment plate 10 of the radio wave control system 1 and received by the outdoor user terminals.

Although FIG. 7 shows an example in which a base station is installed outdoors, the installed base station may include a radio relay station that retransmits radio waves.

EXAMPLES

The present inventors prepared a model (calculation model) capable of calculating the electric field intensity, the phase, and the electric field on the reflection plate for each distance from the phase adjustment plate, and simulated and verified the electric field distribution.

Example 1

Figure 8:
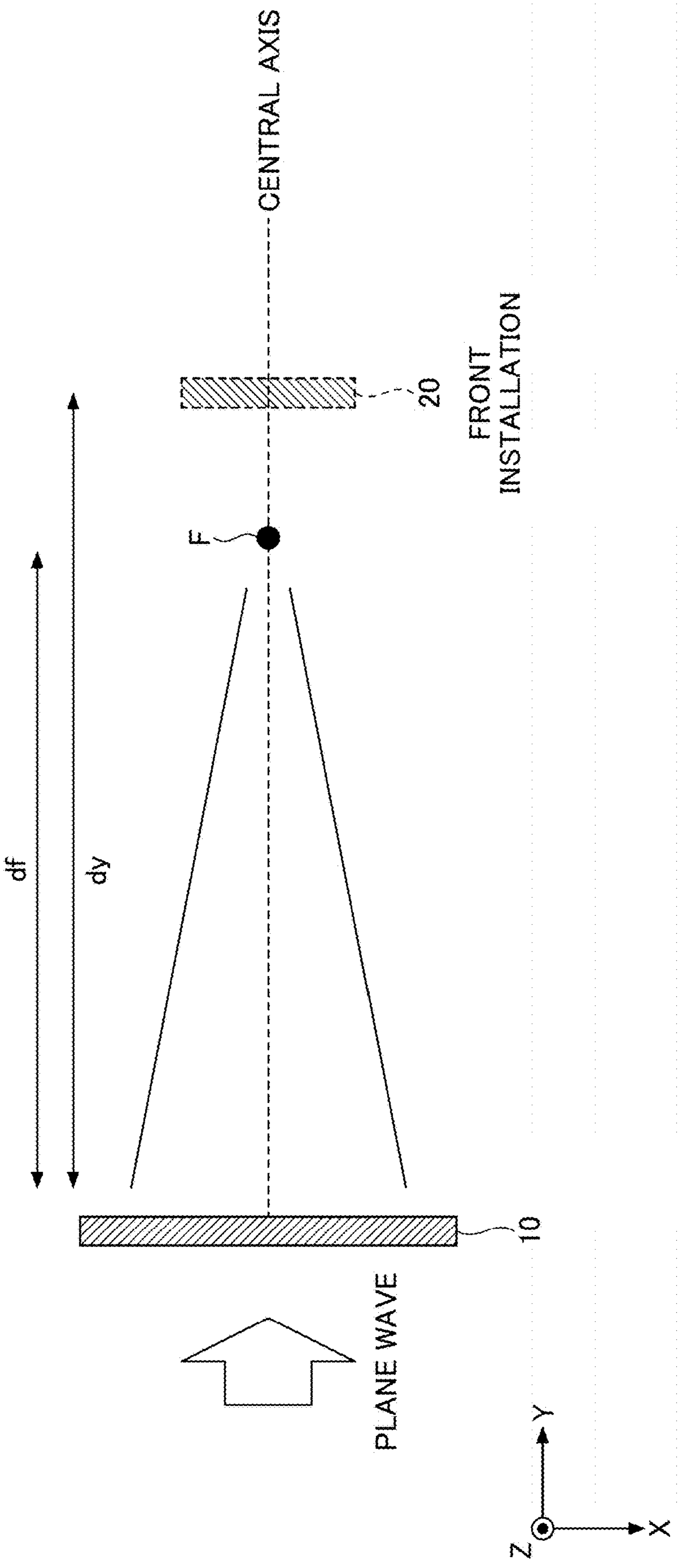
FIG. 8 is a diagram of a calculation model for simulating an electric field of a radio wave transmitted through the phase adjustment plate.

In this example, the electric field intensity of the radio wave transmitted through the phase adjustment plate was simulated for each distance using the calculation model shown in FIG. 8. FIG. 8 is a diagram of a calculation model for simulating the electric field intensity of the radio wave transmitted through the phase adjustment plate 10.

In this calculation model, the phase adjustment plate 10 is a Fresnel lens on which the conductive pattern 12 shown in FIG. 4 is formed, and a lens having a Fresnel order of 6 is used. Further, in this example, the focal point F0 of the phase adjustment plate 10 is located at a distance df of 1000 mm from the lens formed by the conductive pattern 12 of the phase adjustment plate 10.

Figure 9:
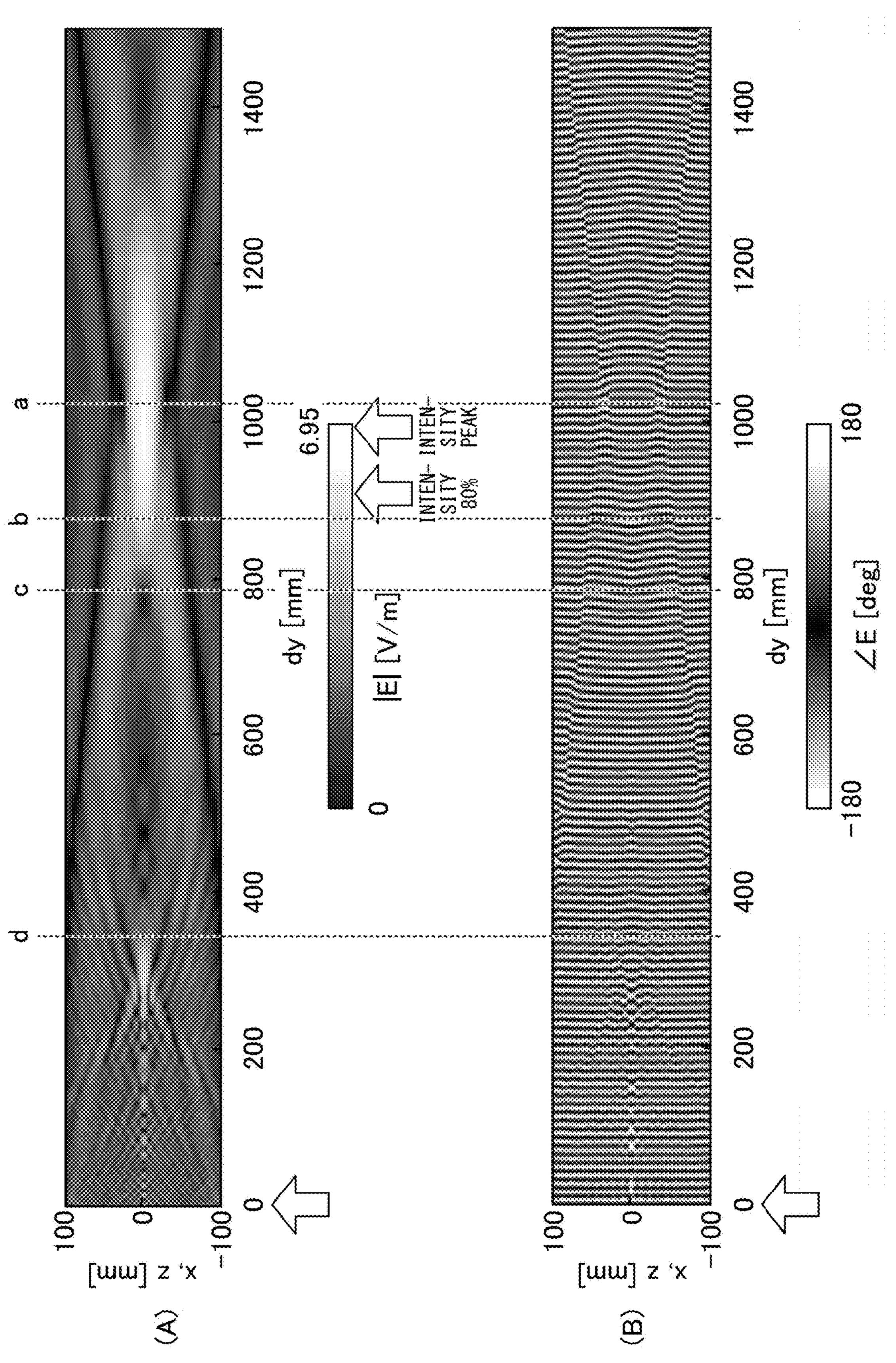
FIG. 9 is a diagram showing an electric field intensity and a phase of the radio wave transmitted through the phase adjustment plate for each distance from the phase adjustment plate.
Figure 10:
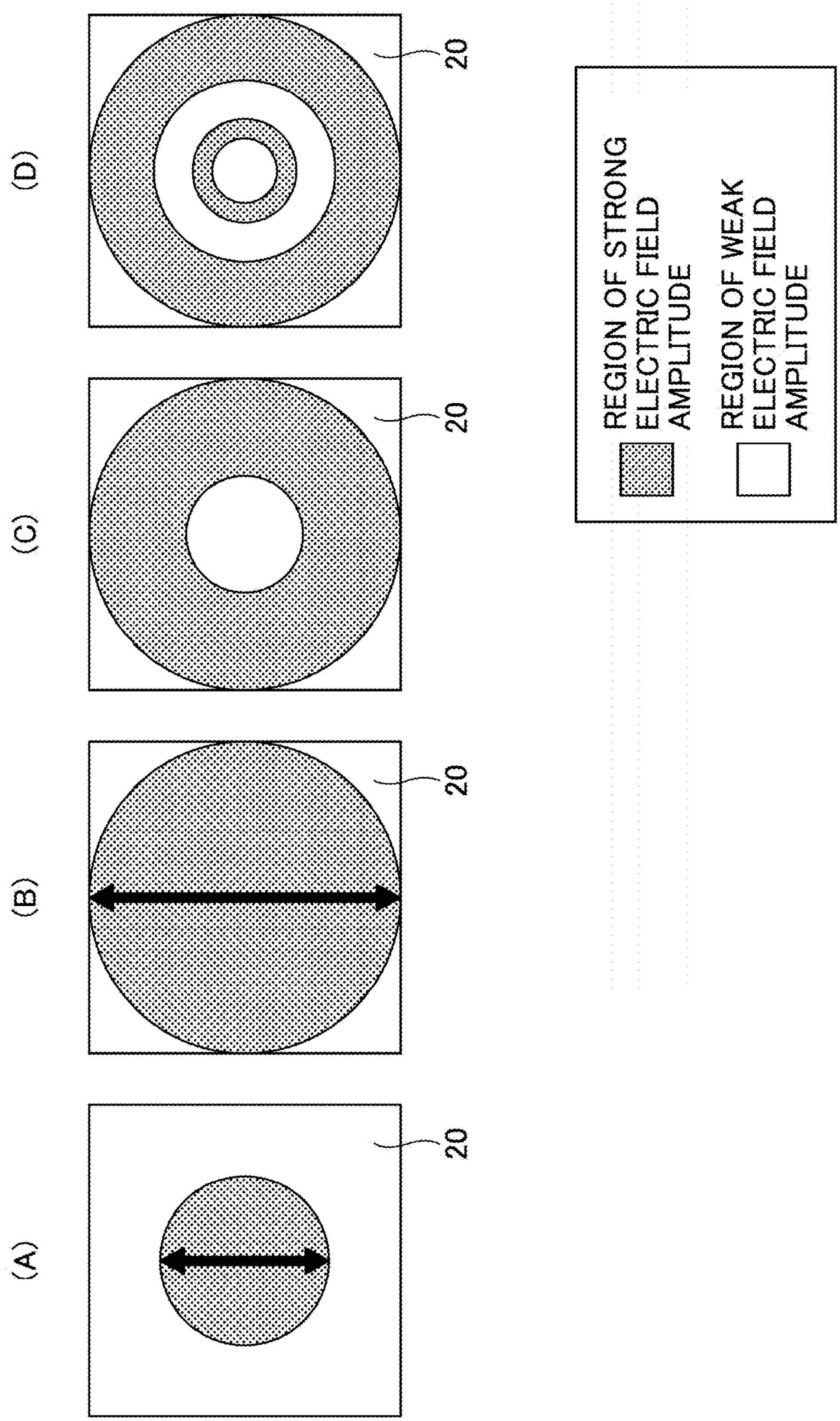
FIG. 10 is a diagram schematically illustrating how the electric field of the radio wave transmitted through the phase adjustment plate spreads on the reflection plate.

In this calculation model, the reflection plate was not disposed when (A) and (B) in FIG. 9 were simulated, and the reflection plate 20 was disposed when (A) to (D) in FIG. 10 were simulated. In this case, the reflection plate 20 was a RIS, and the reflection plate 20 was disposed in front of the phase adjustment plate 10 so that the central axis of the phase adjustment plate 10 and the central axis of the reflection plate 20 coincided with each other, and the distance dy between the reflection plate 20 and the phase adjustment plate 10 was 1300 mm.

Further, in this calculation model, the phase adjustment plate 10 and the reflection plate 20 are not attached to a window or a wall, but are independently installed.

An electric field by a plane wave on the phase adjustment plate 10 is simulated, the plane wave being incident from the second main surface 112 side of the phase adjustment plate 10.

(A) in FIG. 9 shows the electric field intensity of the radio wave transmitted through the phase adjustment plate 10 for each distance from the phase adjustment plate 10, and (B) in FIG. 9 shows the phases of the radio wave transmitted through the phase adjustment plate 10 for each distance from the phase adjustment plate 10.

(A) to (D) in FIG. 10 are conceptual diagrams illustrating how the electric field of the radio wave transmitted through the phase adjustment plate 10 spreads on the reflection plate 20. (A) in FIG. 10 is a conceptual diagram of how the electric field spreads on the reflection plate 20 when the reflection plate 20 is at the position a of the focal point F. (B) to (D) in FIG. 10 are conceptual diagrams of how the electric field spreads on the reflection plate 20 when the reflection plate 20 is at a position other than the focal point.

(A) in FIG. 9 shows the electric field intensity (radio wave intensity) of the radio wave transmitted through the phase adjustment plate 10, that is, the strength of the electric field amplitude. As shown in (A) in FIG. 9, it can be seen that the electric field intensity is the strongest at the focal point F indicated by a line a. Here, the "focal point" in the present specification means "a range in which the electric field intensity is 80% or more of the maximum value (peak) on an axis (central axis, optical axis) passing through the center of the phase adjustment plate and the focal point". Therefore, the position other than the focal point indicates a range in which the electric field intensity on the central axis is less than 80% of the maximum value of the electric field intensity.

In addition, in the spread of the electric field on the reflection plate 20 in (A) to (D) in FIG. 10, a colored portion where the electric field amplitude is strong indicates a region where the electric field amplitude is greater than or equal to the half value of the maximum power, and a non-colored portion where the electric field amplitude is weak indicates a region where the electric field amplitude is less than the half value of the maximum power.

Here, the electric field intensity transmitted through the phase adjustment plate 10 is the strongest at the focal point F. However, as shown in (A) in FIG. 9, at the focal point F, the electric field intensity rapidly decreases as the distance from the central axis increases in the X-direction and the Z-direction on the plane perpendicular to the central axis. Therefore, when the reflection plate 20 having a predetermined size is disposed at the position a of the focal point in (A) in FIG. 9, the irradiation range of the radio wave becomes small with respect to the reflection plate 20 as shown in (A) FIG. 10.

Although the maximum intensity of the electric field passing through the phase adjustment plate 10 is slightly reduced at a position slightly away from the focal point F, the weakening way of the electric field intensity becomes smaller at a position outward in the X-direction and the Z-direction away from the central axis. Therefore, when the reflection plate 20 having a predetermined size is disposed at a position slightly shifted from the focal point as shown by b in (A) in FIG. 9, the irradiation range with respect to the reflection plate 20 becomes larger than that in (A) in FIG. 10 as shown in (B) in FIG. 10. In (B) in FIG. 10, the region where the electric power of the radio wave on the reflection plate 20 is at least half of the maximum electric power occupies a wide area and is irradiated continuously without a hole, i.e., in a simple connection state, so that the state shown in (B) in FIG. 10 is a good spread of the electric field on the reflection plate 20.

Further, the intensity of the electric field passing through the phase adjustment plate 10 becomes weak at a portion close to the central axis as it is further away from the focal point F, and the intensity of the electric field becomes strong at an outer portion away from the central axis in the X-direction and the Z-direction. Therefore, when the reflection plate 20 having a predetermined size is disposed at the position indicated by c in (A) in FIG. 9, as shown in (C) in FIG. 10, although the irradiation range itself with the radio wave on the reflection plate 20 is large, the electric field intensity at the center is weak and less than the half value. Therefore, in a region where the electric power of the radio wave on the reflection plate 20 is more than or equal to half of the maximum electric power, a hole is formed and the region is discontinuous on the surface.

At a position further away from the focal point F and closer to the phase adjustment plate 10, the property of the concentrically transmitted radio wave remains due to the lens effect of the Fresnel ring zone in the Fresnel lens, and therefore the electric field intensity passing through the phase adjustment plate 10 repeats increasing and decreasing as the position is outward away from the central axis in the X- and Z-directions. Therefore, when the reflection plate 20 having a predetermined size is disposed at a position indicated by d in (A) in FIG. 9, an area having a strong electric field intensity and an area having a weak electric field intensity are repeated concentrically on the reflection plate 20 as shown in (D) in FIG. 10. As a result, in a region where the electric power of the radio wave on the reflection plate 20 is more than or equal to half of the maximum electric power, holes are concentrically formed and the region is discontinuous on the surface.

Here, as shown in FIG. 6, the reflection plate 20 included in the radio wave control system 1 of the present invention is a reflect array in which a plurality of cells 21 are gathered, and the reception power is proportional to the area. The degree of convergence of the radio waves radiated from the reflection plate 20 is also proportional to the area, and the received power is proportional to a square of the area A of the reflection plate 20. Therefore, the larger the size of the reflection plate 20 is, the better the performance is.

At the position of the focal point F, a peak (white region in the drawing) where the electric field intensity is the largest is included as in the position a in (A) in FIG. 9, and the electric field intensity is strong, but the irradiation region of the radio wave with respect to the reflection plate is small as in (A) in FIG. 10. Therefore, when a large reflection plate is set, radio waves are not reflected outside the reflection plate. Therefore, depending on the size of the reflection plate, the reflection efficiency is increased by disposing the reflection plate at a position other than the focal point.

For example, it is assumed that each cell of the reflection plate can efficiently reflect at least half of the maximum power of the radio wave passing through the phase adjustment plate. With respect to the electric power passing through the phase adjustment plate in the positional relationship between the phase adjustment plate and the reflection plate, when the electric power of the radio wave on the reflection plate is observed, it is preferable that the area of the region having the electric field intensity more than or equal to half of the maximum electric power is 50% or more of the area of the reflection plate. Further, it is more preferable that the electric power of the radio wave incident on the reflection plate is more than or equal to half of the maximum electric power and the amplitude is substantially constant. For example, in the example shown in (B) in FIG. 10, the colored irradiation region having the electric field intensity higher than or equal to the half value of the maximum power is 63% of the entire surface of the reflection plate 20.

Additionally, for wide electric field, as the reflected electric field intensity is closer to the peak, the reflection power of the radio wave reflected by the reflection plate is better. Therefore, it is preferable to dispose the reflection plate at a position other than the focal point but close to the focal point. Here, with reference to (A) in FIG. 9, the focal point refers to a region where the electric field intensity on the central axis of the radio wave transmitted through the phase adjustment plate 10 is 80% or more of the maximum value. Therefore, installing the reflection plate 20 at a position other than the focal point means installing the reflection plate 20 in a range where the electric field intensity on the central axis is less than 80% of the maximum value of the electric field intensity.

Further, in the reflection plate 20 constituted by the reflect array, a cell to which a radio wave is incident reflects the radio wave, and a cell to which a radio wave is not incident does not reflect the radio wave. Therefore, it is desirable that the intensity of the radio wave incident on the reflection plate 20 is not partially weak and the intensity of the incident radio wave is maintained at a certain level or more. That is, it is preferable that the region where the electric power is half or more of the maximum electric power on the reflection plate 20 has no hole and is continuous and simply connected.

Referring to (B) in FIG. 9, it can be seen that the phase distortion of the radio wave passing through the phase adjustment plate 10 is small at the focal point F indicated by the line a, and the phase distortion increases as the distance from the focal point increases.

In general, the reflection plate has good performance when the phase of the incident radio wave is constant. However, when the reflection plate 20 of the present invention is an array with controllable directivity such as an RIS, as described in FIG. 6, since the reflection phase is set in consideration of the phase difference of the incident radio wave, the reflection angle can be appropriately adjusted even if the reflection plate 20 is not arranged at the focal point but at a position shifted from the focal point where the phase is slightly distorted.

Here, based on the electric field intensity simulated in (A) in FIG. 9, the half-power diameter, the power integration ratio, and the area ratio on the reflection plate 20 were calculated for each distance from the phase adjustment plate 10.

The half-power diameter on the reflection plate 20 corresponds to a diameter of a circle indicated by an arrow in the examples of (A) and (B) in FIG. 10, for example, and the half-power diameter is 0 in the examples of (C) and (D) in FIG. 10 because the electric field amplitude is weak at the center.

Figure 11:
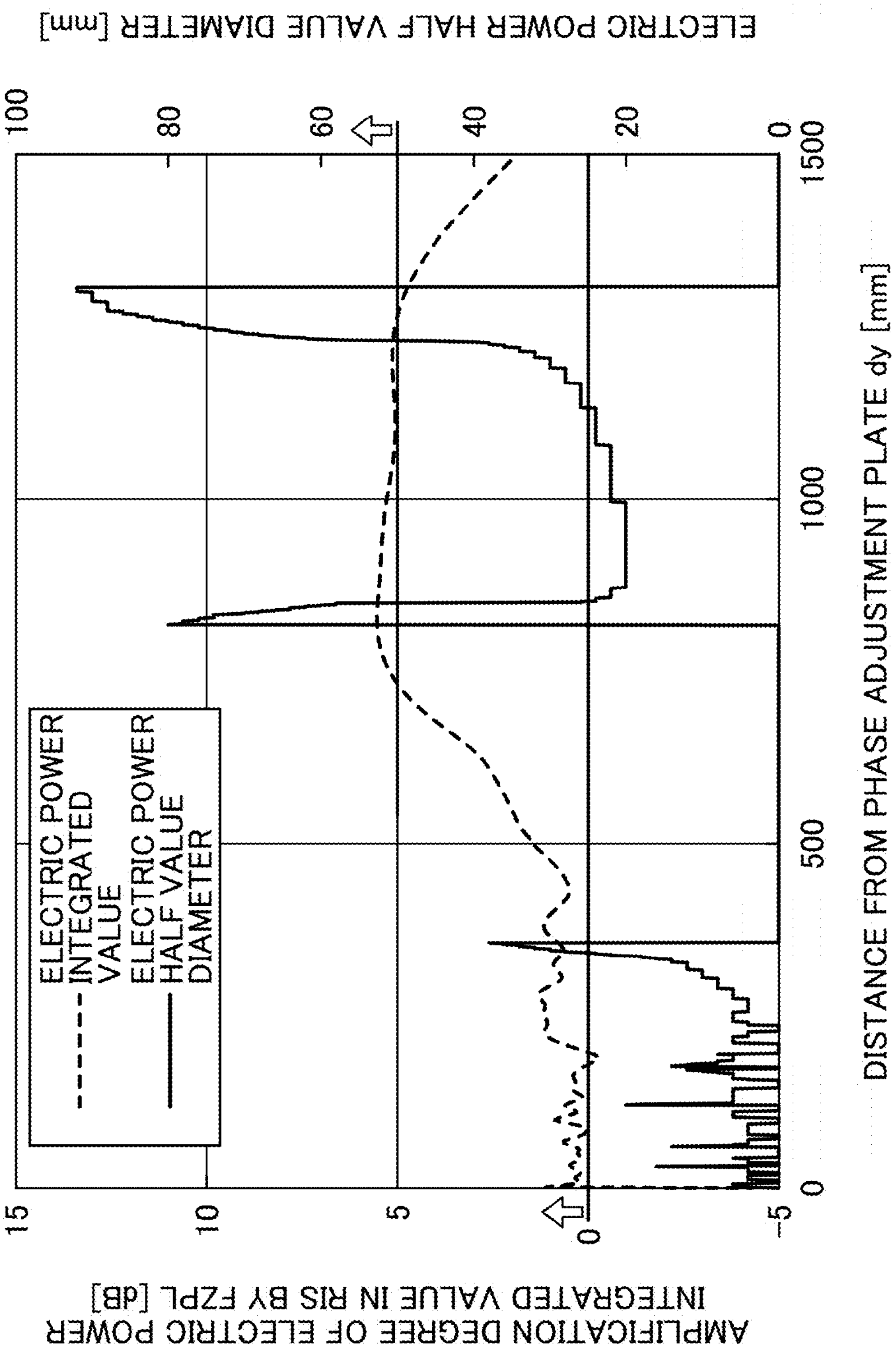
FIG. 11 is a diagram showing a power integral value and a half-power diameter for each distance from the phase adjustment plate.

FIG. 11 is a diagram showing a power integral value and a half-power diameter. In this example, the half-power diameter was calculated by using the reflection plates having a size of 100 mm in order to compare the half-power diameter within the reflection plates.

In the present invention, in the radio wave control system, it is desirable to dispose the reflection plate so that the electric field intensity becomes stronger than the electric field intensity in a configuration in which the reflector is not provided. Therefore, it is necessary to dispose the reflection plate at a position where the power integral value of the radio wave on the reflection plate is larger than that when the phase adjustment plate is not provided. That is, the reflection plate is disposed at a position where the amplification factor of the amplitude of the radio wave transmitted through the phase adjustment plate is larger than 0 dB (1 in antilogarithm). Therefore, in the example of FIG. 11, the reflection plate is preferably provided at a position where the distance from the phase adjustment plate 10 is 0 to 1500 mm.

Further, when the electric power of the radio wave on the reflection plate is observed, it is more preferable that the half-value diameter corresponding to a contour of the region where the electric power is more than or equal to the half-value of the maximum electric power is 50% or more of the area of the reflection plate. Therefore, in the example of FIG. 11, it is more preferable that the reflection plate is provided at a position where the distance from the phase adjustment plate 10 is 820 mm to 850 mm or 1230 mm to 1310 mm.

In a mathematical expression, it is preferable that a value obtained by averaging absolute values of electric field intensities of radio waves transmitted through the phase adjustment plate on the reflection plate, Ave[|E|], and a value obtained by averaging absolute values of electric field intensities of radio waves when the reflection plate is placed at a focal point on the reflection plate, Ave[|$E_f$|], satisfy $$Ave[|E|]/Ave[|E_f|]>1,$$

as the preferable position of the reflection plate.

The value Ave[|E|] is obtained by the following Equation (6).

[Math 6]

$$Ave[|E|] = \int_{RIS} \frac{dS}{S}|E|, \tag{6}$$

where S represents the area of the reflection plate, and E represents the electric field intensity of the radio wave transmitted through the phase adjustment plate.

In order to find this, a candidate is a position satisfying (P×S)/(P0×S0)>1, where P is a value obtained by integrating the power of the radio wave transmitted through the phase adjustment plate on the reflection plate, S is an area of a half-power plane on the reflection plate, and values of P and S in the absence of the phase adjustment plate are P0 and S0.

Figure 12:
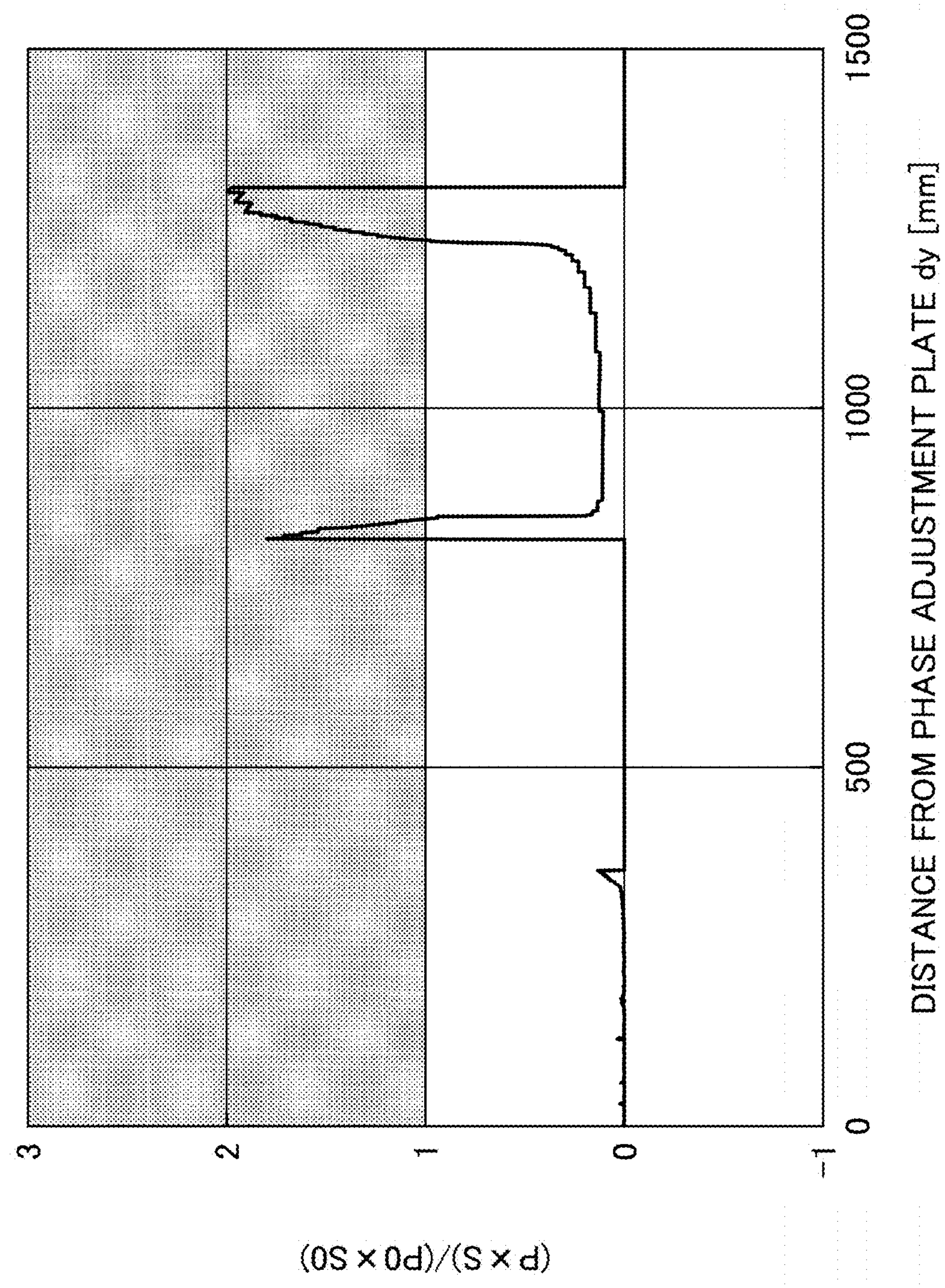
FIG. 12 is a diagram showing a ratio $(P \times S)/(P0 \times S0)$ of a product of the power integral value on the reflection plate and an area of the half-power plane on the reflection plate with the phase adjustment plate being present to a product of the power integral value on the reflection plate and an area of the half-power plane on the reflection plate without the phase adjustment plate, for each distance from the phase adjustment plate.

FIG. 12 is a diagram showing the ratio (P×S)/(P0×S0) of the product of the power integral value on the reflection plate and the area of the half-power plane on the reflection plate when the phase adjustment plate is present to the product of the power integral value on the reflection plate and the area of the half-power plane on the reflection plate when the phase adjustment plate is absent. Here, since an irradiation area ratio is obtained by dividing the area of the half-power region by the area of the reflection plate (S/S0), the waveform of FIG. 12 shows a tendency similar to the half-power diameter of FIG. 11.

The amplification factor is calculated in the table of FIG. 13. The information obtained from the electric field intensity with respect to the reflection plate is summarized in the table of FIG. 13. FIG. 13 is a table showing a calculation formula of the electric field intensity reflected from the reflection plate. In FIG. 13, k represents an electric field amplification factor by the phase adjustment plate, and ζ represents a vacuum impedance (120πΩ).

In the present invention, as described in (A) to (D) in FIG. 10, in order to increase the effectiveness on the reflection plate, it is preferable to arrange the reflection plate at a position where the area of the half-value plane, which is a region where the power of the radio wave on the reflection plate is half or more of the maximum power, is 50% or more of the area of the reflection plate as shown in (B) in FIG. 10.

Therefore, in the example of the graph showing the amplification factor×the irradiation area ratio in FIG. 12, it is more preferable that the reflection plate 20 is provided at a position where the distance from the phase adjustment plate 10 is 820 mm to 850 mm or 1230 mm to 1310 mm.

In the above-described preferable range, the positions of 850 mm and 1230 mm on the side closer to the focal point are separated from the position of the focal point F by about 200 mm, that is, about 20% to 30% of the focal distance. Therefore, in the present embodiment using the phase adjustment plate 10 having the Fresnel order of 6, it is preferable that the reflection plate 20 is disposed away from the focal point of the phase adjustment plate 10 by 20% or more of the focal length.

The above-described optimum position of the reflection plate 20 with respect to the phase adjustment plate 10 is a result when the Fresnel order is 6 or less. For example, when the Fresnel order is greater than 6 and less than or equal to 12, the distance from the focal point is preferably 15% or more of the focal length. When the Fresnel order is larger than 12 and less than or equal to 24, the distance is preferably 7% or more of the focal length.

In the present embodiment, as an example in which the reflection plate is disposed at a position where the area of the region, where the power of the radio wave on the reflection plate is more than or equal to half of the maximum power, is more than or equal to 50% of the area of the reflection plate, so that the electric field intensity becomes stronger by providing the reflection plate than in the configuration without the reflection plate, the configuration where the reflection plate is disposed at a position away from the focal point has been shown. However, the method of setting the area of the region, where the power of the radio wave is more than or equal to half of the maximum power, is more than or equal to 50% of the area of the reflection plate is not limited to this method. For example, the phase adjustment plate may have a plurality of focal points, and the reflection plates may be disposed at a position including each of the plurality of focal points.

Example 2

Figure 14:
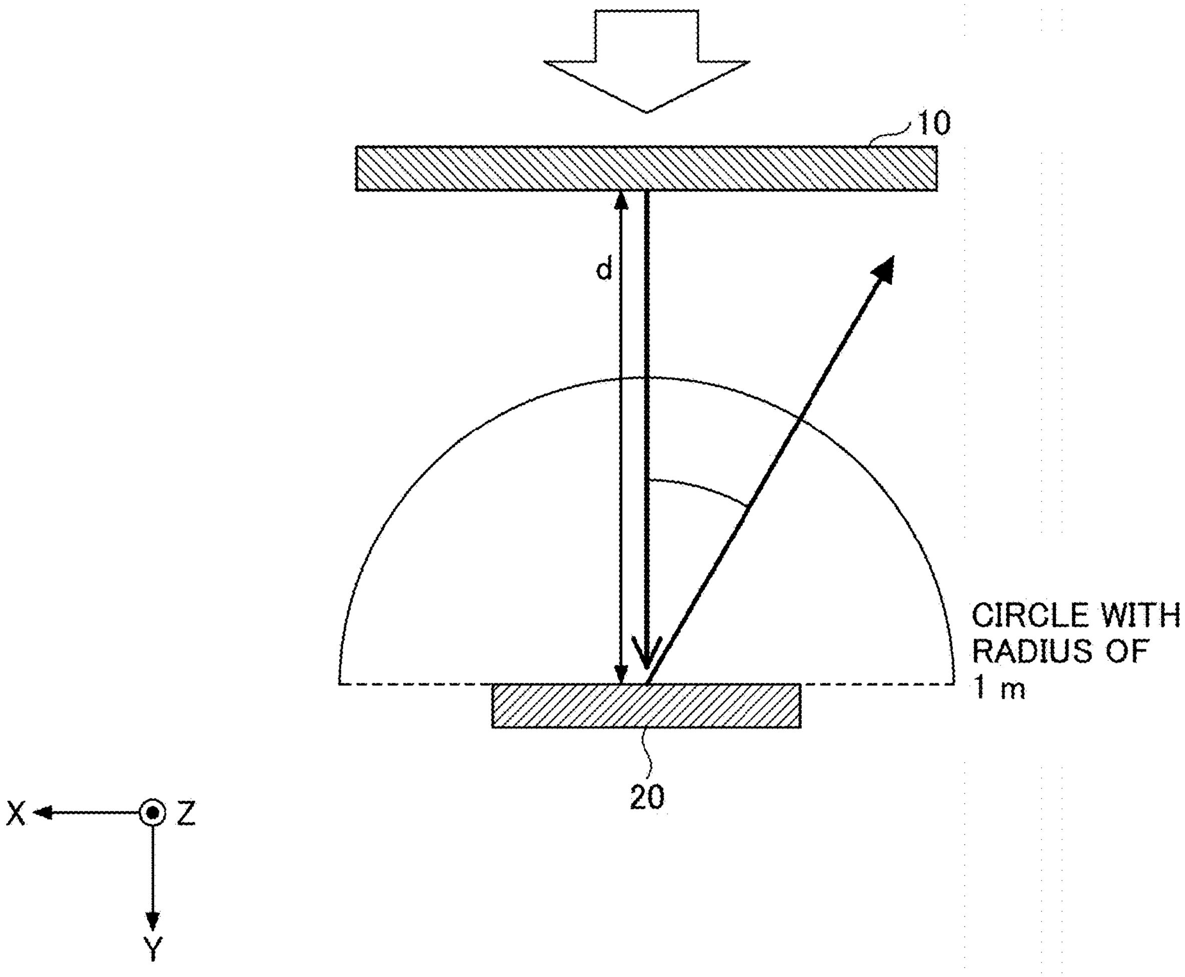
FIG. 14 is a diagram of a calculation model for simulating an electric field spreading from the reflection plate of the present invention.

In this example, in a calculation model shown in FIG. 14, simulation was performed for an electric field intensity of an electric field reflected from a reflection plate while changing conditions.

FIG. 14 is a diagram illustrating the calculation model for simulating an electric field spreading from the reflection plate of the present invention. In this embodiment, the phase adjustment plate 10 was a Fresnel lens, and the Fresnel order was set to 6. The reflection plate 20 was an RIS, the target angles of the reflected radio wave were an azimuth angle of 30° and an elevation/depression angle of 0°, and the electric field intensity of the plane wave incident on the phase adjustment plate 10 was 0 dBV/m.

Figure 15:
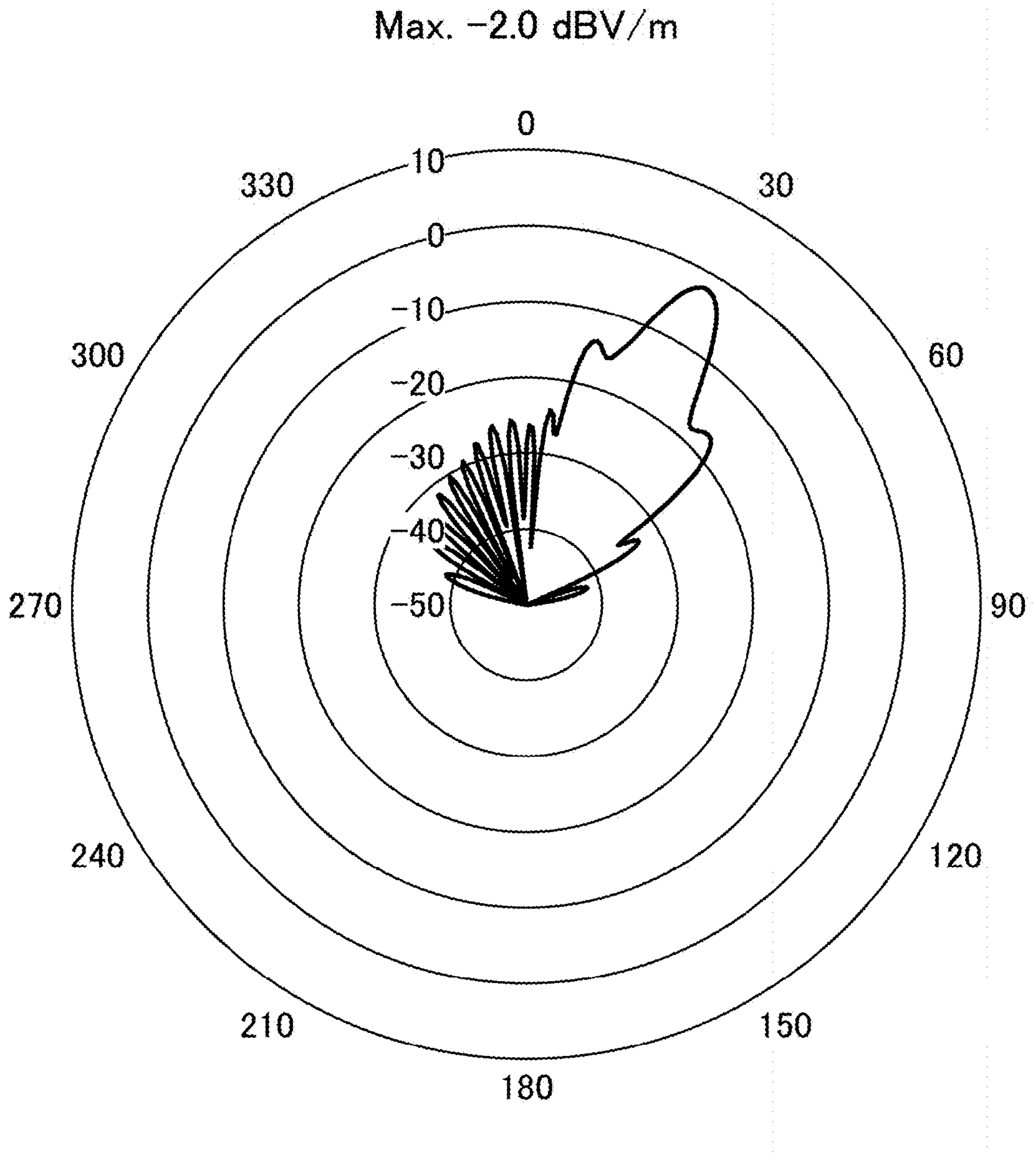
FIG. 15 is a radar chart showing an electric field intensity at a peripheral radius of 1 m around the reflection plate when the reflection plate is provided at a focal point of the phase adjustment plate in the calculation model of FIG. 14.

FIG. 15 is a radar chart showing the electric field intensity at the peripheral radius of 1 m of the reflection plate when the reflection plate 20 was provided at the focal point of the phase adjustment plate 10 in the calculation model of FIG. 14. FIG. 15 shows a result of simulation assuming that the distance between the phase adjustment plate 10 and the reflection plate 20 in the calculation model of FIG. 14 was 1000 mm which was the focal distance. In this calculation, as shown in FIG. 15, the maximum value of the electric field intensity was at the position of 30° as the target angle of 30°, and the maximum value was −2.0 dBV/m.

Figure 16:
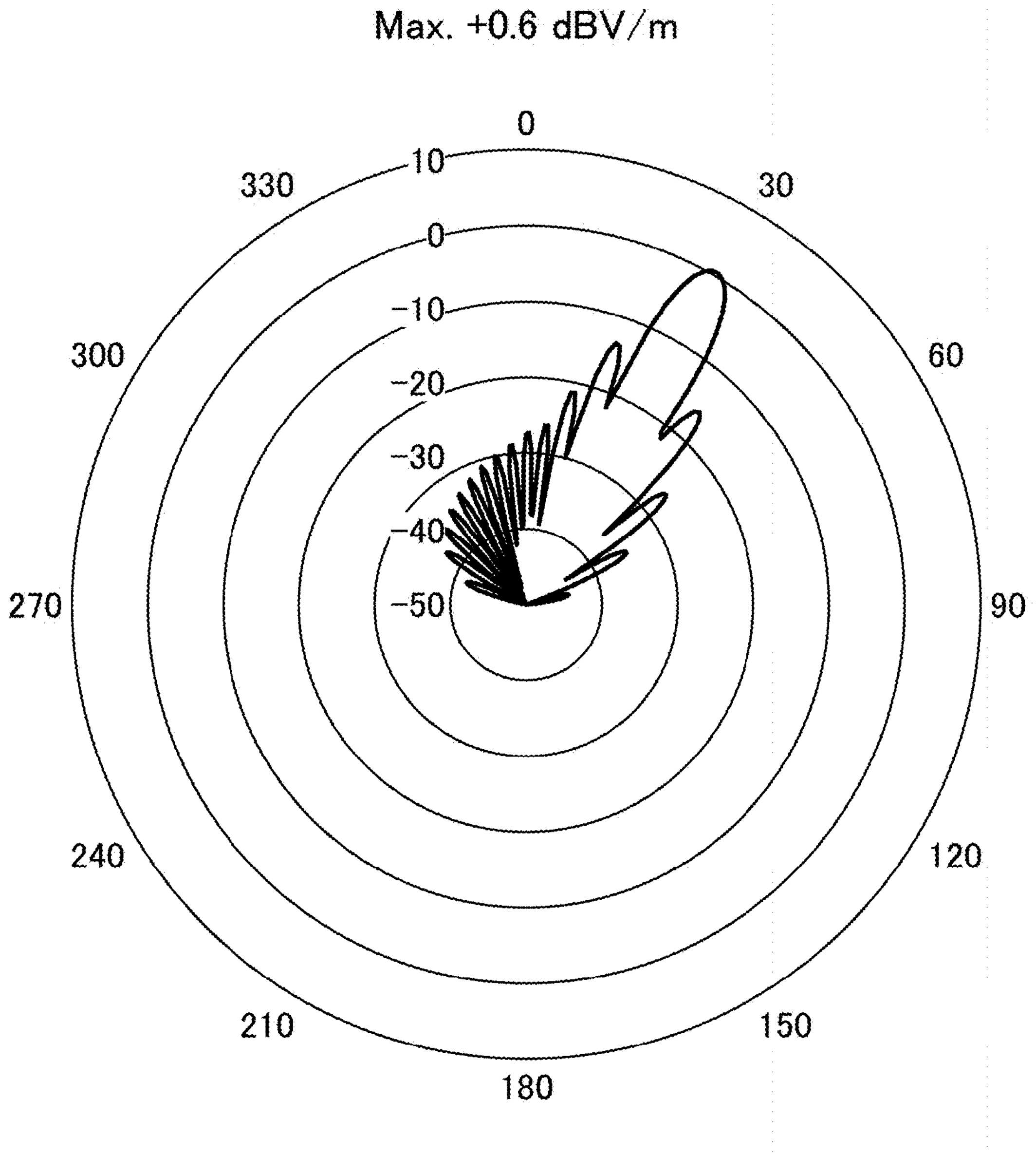
FIG. 16 is a radar chart showing an electric field intensity at a peripheral radius of 1 m around the reflection plate when the reflection plate is provided at a position displaced from the focal point of the phase adjustment plate in the calculation model of FIG. 14.

FIG. 16 is a radar chart showing the electric field intensity at the peripheral radius of 1 m of the reflection plate when the reflection plate was provided at a position deviated from the focal point of the phase adjustment plate in the calculation model of FIG. 14. FIG. 16 shows a result of simulation assuming that the distance between the phase adjustment plate 10 and the reflection plate 20 in the calculation model of FIG. 14 was 1300 mm that deviated from the focal distance. As shown in FIG. 16, the maximum value of the electric field intensity was at the position of 30° as the target angle was 30°, and the maximum value was +0.6 dBV/m.

Figure 17:
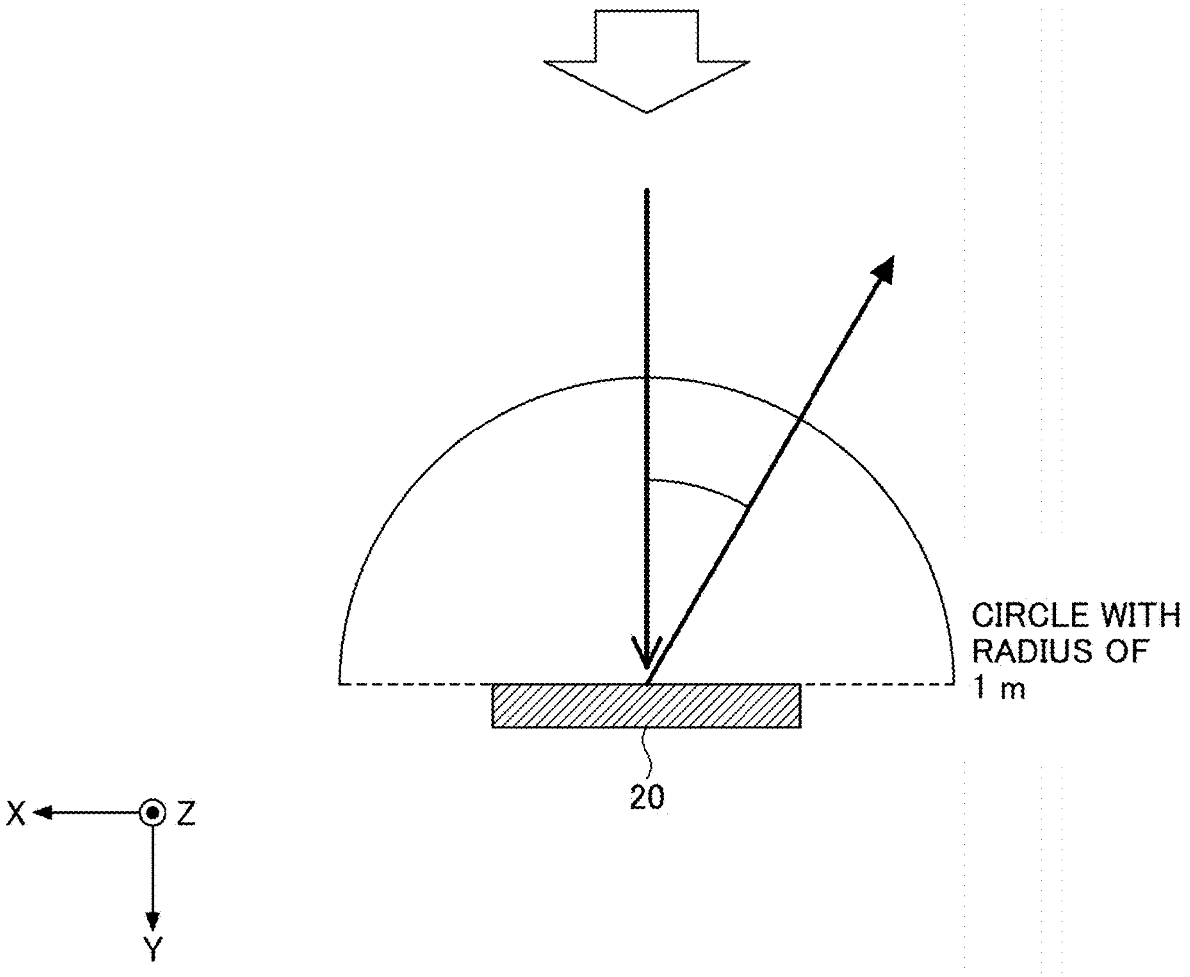
FIG. 17 is a diagram of a calculation model when simulating an electric field spreading from the reflection plate without providing the phase adjustment plate in a comparative example.

FIG. 17 is a diagram illustrating a calculation model according to a comparative example for simulating an electric field spreading from a reflection plate without providing a phase adjustment plate.

Figure 18:
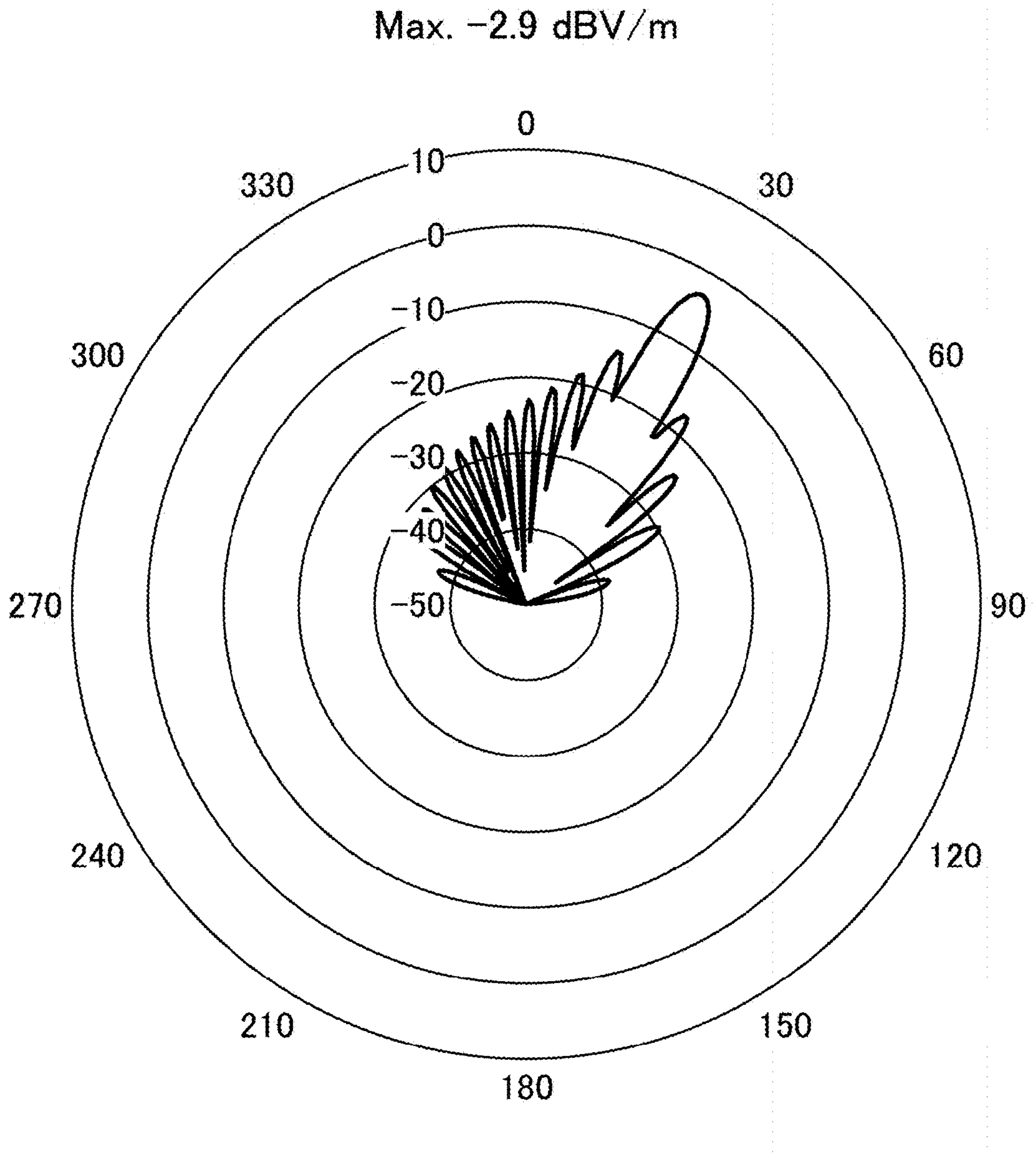
FIG. 18 is a radar chart showing an electric field intensity at a peripheral radius of 1 m around the reflection plate in the model of the comparative example of FIG. 17.

FIG. 18 is a radar chart showing the electric field intensity at the peripheral radius of 1 m of the reflection plate in the model of the comparative example shown in FIG. 17. As shown in FIG. 18, the maximum value of the electric field intensity was at the position of 30° as the target angle of 30°, and the maximum value was −2.9 dBV/m.

Figure 19:
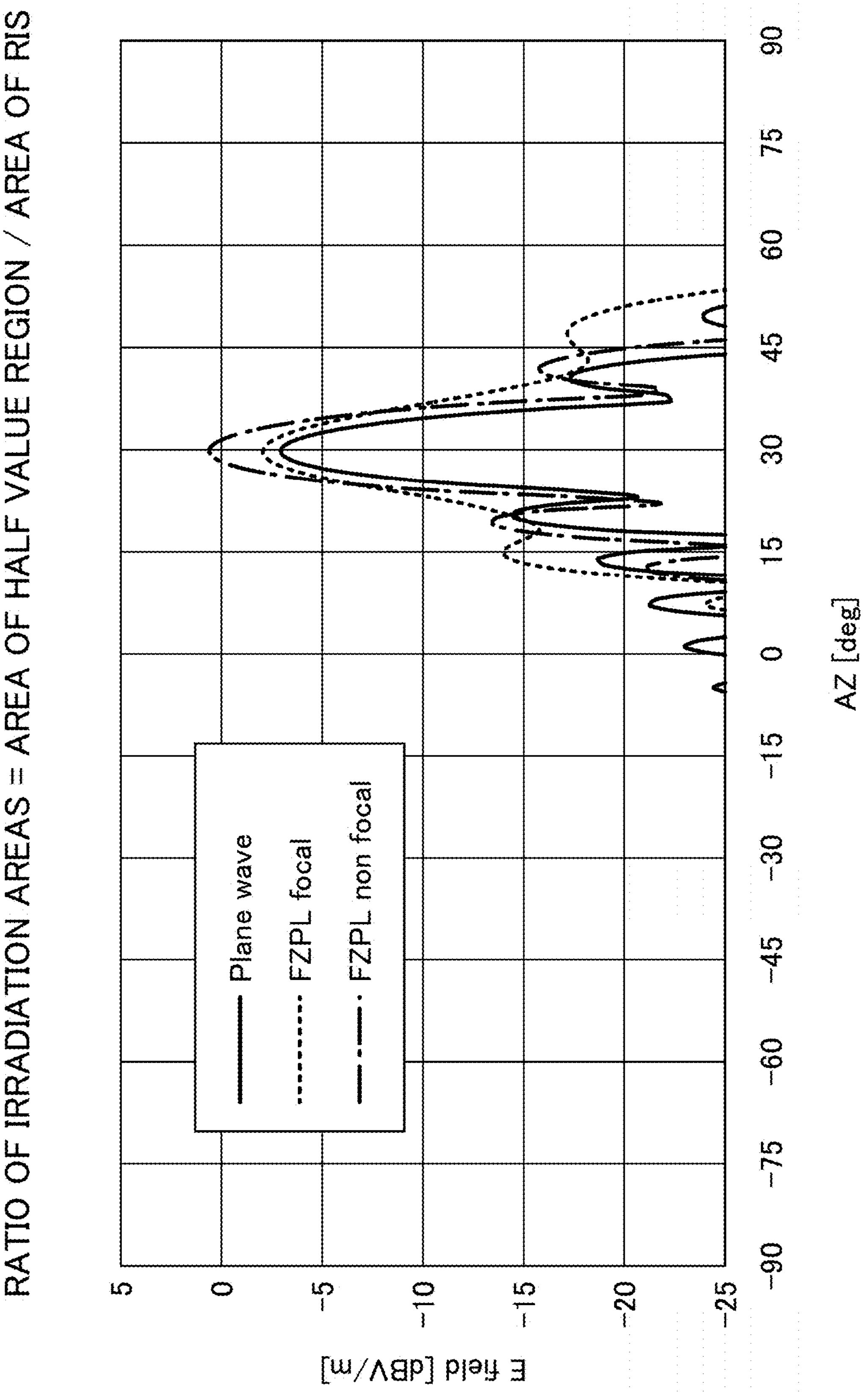
FIG. 19 is a diagram showing electric field intensities at a peripheral radius of 1 m around the reflection plates of FIGS. 15, 16, and 18 comparing with each other.

FIG. 19 is a diagram showing the electric field intensities at the peripheral radius of 1 m of the reflection plates in the simulations shown in FIGS. 15, 16 and 18. In FIG. 19, a solid line "Plane wave" indicates a waveform of the electric field intensity when the phase adjustment plate is not provided (FIG. 17), a broken line "FZPL focal" indicates a waveform of the electric field intensity when the reflection plate 20 is disposed at the focal point, and a dashed-dotted line "FZPL non focal" indicates a waveform of the electric field intensity when the reflection plate 20 is disposed at a position deviated from the focal point.

When the three waveforms in FIG. 19 are compared with each other, the maximum value of the electric field intensity in the case where the phase adjustment plate was provided is greater than that in the case where the phase adjustment plate was not provided. In addition, the peak of the electric field intensity of the reflected radio wave is larger when the reflection plate 20 was disposed at a position deviated from the focal point of the phase adjustment plate 10 than when the reflection plate 20 was disposed at the focal point of the phase adjustment plate 10.

FIG. 20 is a table showing the electric field amplification factor at the peripheral radius of 1 m of the reflection plate, the power integral value on the reflection plate, the half-power diameter, Ave[|E|]/Ave[|$E_0$|] on the reflection plate, and the power integral value×irradiation area ratio (P×S)/(P0×S0) in measurement models.

In the table of FIG. 20, comparing the electric field amplification factor at the peripheral radius of 1 m of the reflection plate, the power integral value on the reflection plate, the half-power diameter, and Ave[|E|]/Ave[|$E_0$|] in the case of the presence of the phase adjustment plate 10 with those in the case of the absence of the phase adjustment plate 10, it was found that the case where the phase adjustment plate 10 was provided is better than the case where the phase adjustment plate 10 was not provided. In FIG. 20, comparative values are also shown when the case where the phase adjustment plate was provided is set to 1.

Here, the ratio Ave[|E|]/Ave[|$E_0$|] is a value associated with an increase in the electric field amplification factor at the peripheral radius of 1 m of the reflection plate from the case where the phase adjustment plate 10 was not provided. For example, when the reflection plate is located at a position of 1.3 m from the phase adjustment plate, the field amplification factor increases by +0.6 dB−(−2.9 dB)=3.5 dB, and the ratio Ave[|E|]/Ave[|$E_0$|] increases by 4.6 dB. In addition, in the case where the reflection plate is located at the position of 1 m from the phase adjustment plate, the field amplification factor increases by −2.0 dB−(−2.9 dB)=0.9 dB, and the ratio Ave[|E|]/Ave[|$E_0$|] increases by 1.6 dB.

In addition, in the table of FIG. 20, results of comparison for the electric field amplification factor at the peripheral radius of 1 m of the reflection plate, the power integral value on the reflection plate, the half-power diameter, Ave[|E|]/Ave[|$E_0$|], and the power integral value on the reflection plate×the irradiation area ratio between different positions of the reflection plate 20 shows that the case where the position of the reflection plate 20 is deviated from the focal point is better than the case where the position of the reflection plate 20 is the focal point.

Further, both the power integral value×irradiation area ratio on the reflection plate and Ave[|E|]/Ave[|$E_0$|] become maximum values when the electric field amplification factor becomes maximum at the radius of 1.3 m, that is, when the phase adjustment plate is placed at a position separated from the focal point by 1.3 m. Therefore, if the RIS is installed on the basis of the above-described two indices, good characteristics can be obtained. Further, Ave[|E|]/Ave[|$E_0$|] has a good correlation with the electric field amplification factor at the radius of 1 m. Therefore, more preferable characteristics can be obtained by using Ave[|E|]/Ave[|$E_0$|] as an index.

Therefore, in the example 2 using the phase adjustment plate 10 having the Fresnel order of 6, it is preferable that the reflection plate 20 is disposed at a position which is not the focal point of the phase adjustment plate 10 and is away from the focal distance by 20% or more.

In addition, in the table of FIG. 20, (P×S)/(P0×S0) deteriorates at the focal point. This is because this parameter is a calculation formula for searching for a suitable position other than the focal point, and cannot be applied at the focal point. Since this index of (P×S)/(P0×S0) can be calculated more easily than the index of Ave[|E|]/Ave[|E0|], there is an advantage that a suitable position other than the focal point can be determined easily.

Figure 21:
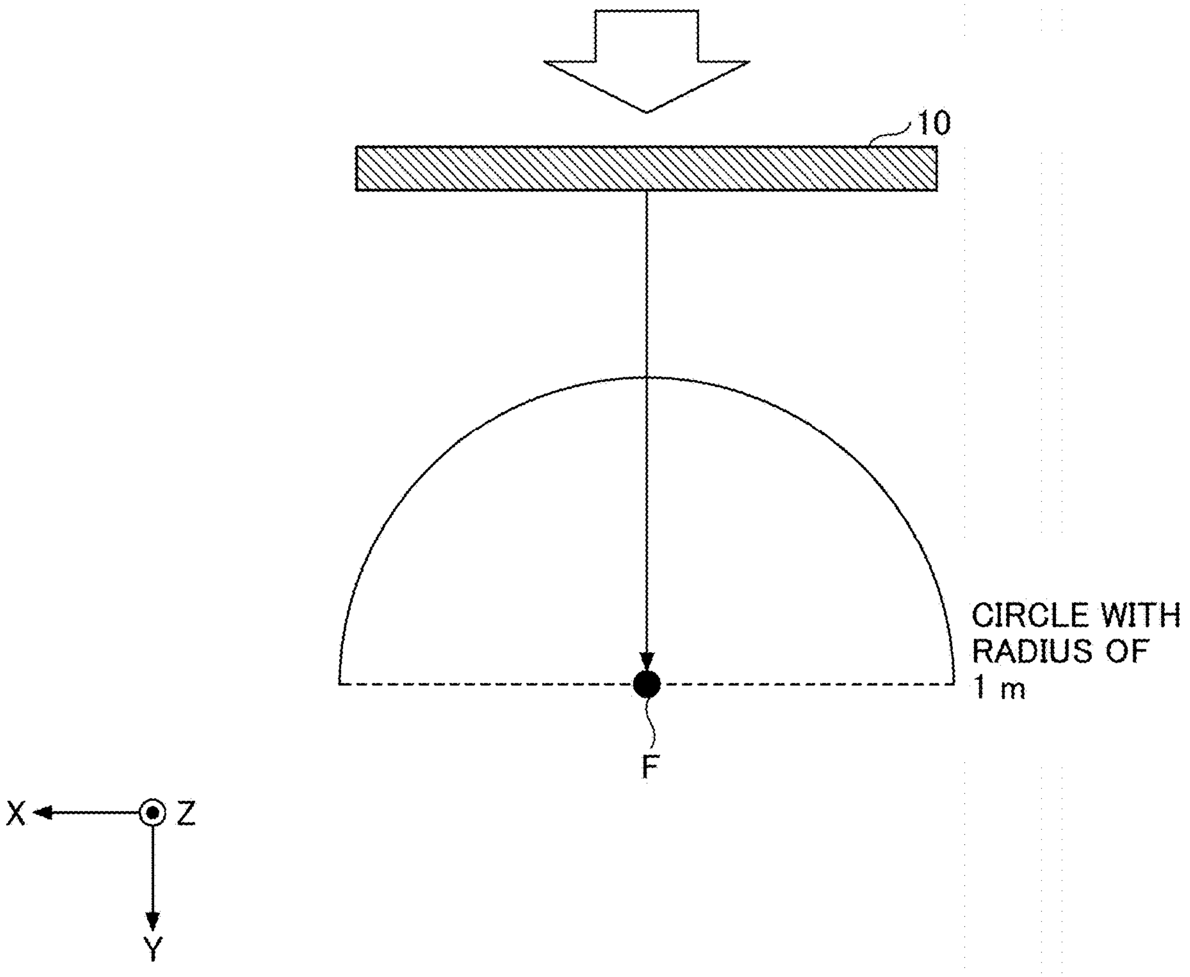
FIG. 21 is a diagram showing a calculation model when simulating an electric field spreading from the focal point of the phase adjustment plate without providing the reflection plate in the comparative example.

FIG. 21 is a diagram illustrating a calculation model when simulating an electric field spreading from a focal position of a phase adjustment plate without providing a reflection plate in the comparative example.

Figure 22:
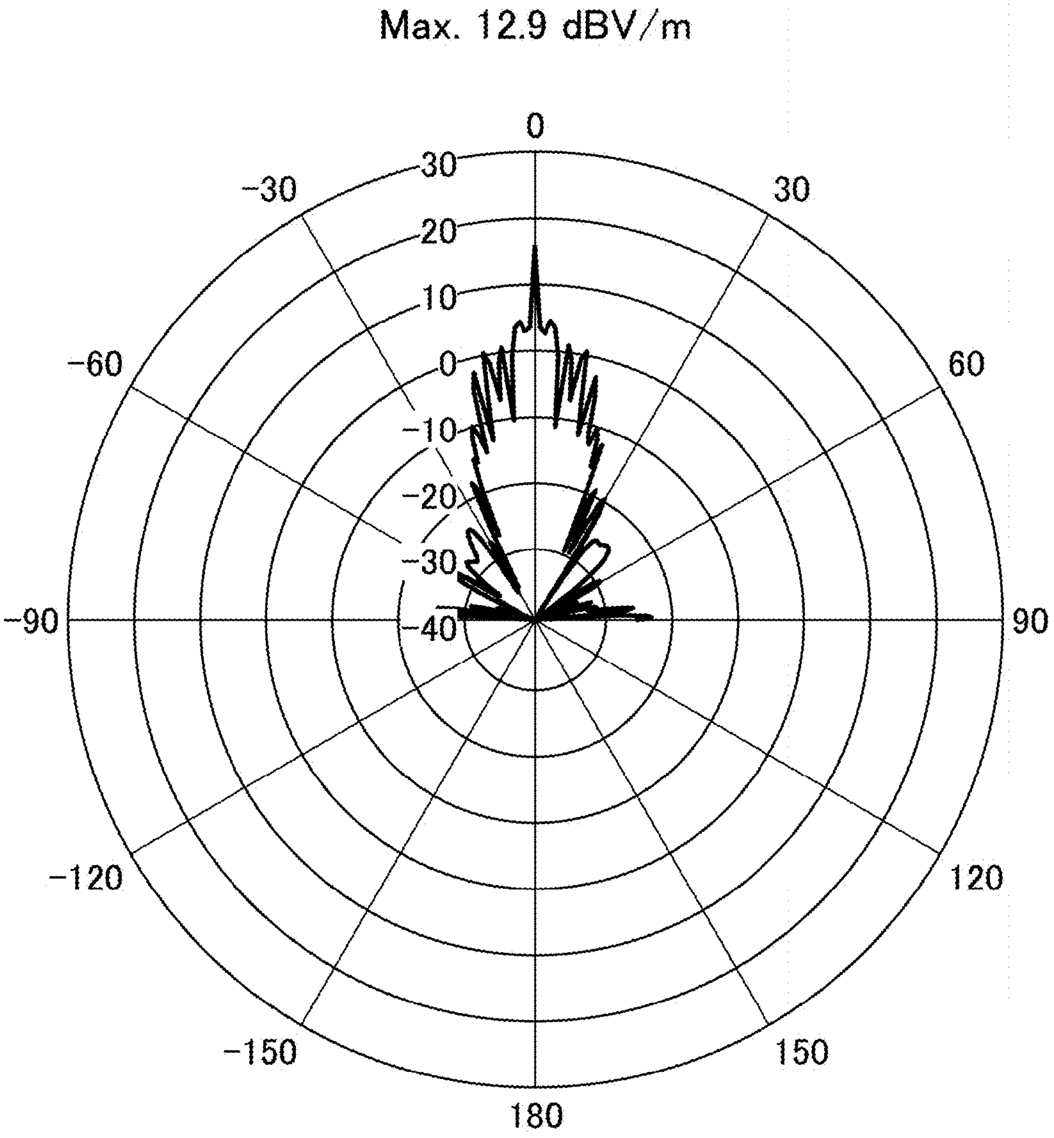
FIG. 22 is a radar chart showing an electric field intensity at a peripheral radius of 1 m around the focal position of the phase adjustment plate in a model of the comparative example of FIG. 21.

FIG. 22 is a radar chart showing the electric field intensity of the model of the comparative example shown in FIG. 21 at the peripheral radius of 1 m of the focal position of the phase adjustment plate. As shown in FIG. 22, the maximum value of the electric field intensity is 12.9 dBV/m.

In the calculation model of FIG. 21, the radio wave incident on the front surface of the phase adjustment plate 10 is not reflected by the reflection plate 20 into the room, so that the radio wave reaches only the front surface of the phase adjustment plate 10. Therefore, when the electric field intensities in FIG. 22 are compared with those in FIGS. 15 and 16, the maximum value of the electric field intensity in FIG. 22 is only in the front direction of the phase adjustment plate, and the reflection angle shown in FIG. 22 is narrower than that in the case where the reflection plate is provided. Therefore, the receivable range in the peripheral radius of 1 m becomes wider when the reflection plate 20 is present in the radio wave traveling direction of the phase adjustment plate 10 than when the reflection plate 20 is not provided. Further, although not shown, such a strong electric field intensity does not appear around the phase adjustment plate at a distance other than 1 m. This is because the focal distance of the phase adjustment plate is 1 m.

As described above, as shown by the waveforms of the electric field intensity in FIGS. 19 and 22, it is found that in the radio wave control system of the present invention, since both the phase adjustment plate and the reflection plate are provided, the electric field intensity is improved more than the case where only the phase adjustment plate is provided or the case where only the reflection plate is provided. Thus, in the radio wave control system of the present invention, electric power can be collected by the phase adjustment plate, and radio waves can be efficiently delivered in a desired direction by the reflection plate.

In the present embodiment, the electric field intensity was simulated also for a measurement model in which an array antenna was mounted instead of the reflection plate at a distance 1300 mm shifted from the focal point of the phase adjustment plate, but the effect of the reflection plate was not obtained. That is, as compared with the case where the phase adjustment plate is placed at the focal point, no improvement effect was observed in the case where the phase adjustment plate is displaced from the focal point.

Second Embodiment

In the first embodiment, the example in which the phase adjustment plate 10 was provided on the window glass and the reflection plate 20 was provided on the wall was illustrated. However, the phase adjustment plate 10 and the reflection plate 20 may be integrated and provided on the wall in the radio wave control system of the present invention.

Figure 23:
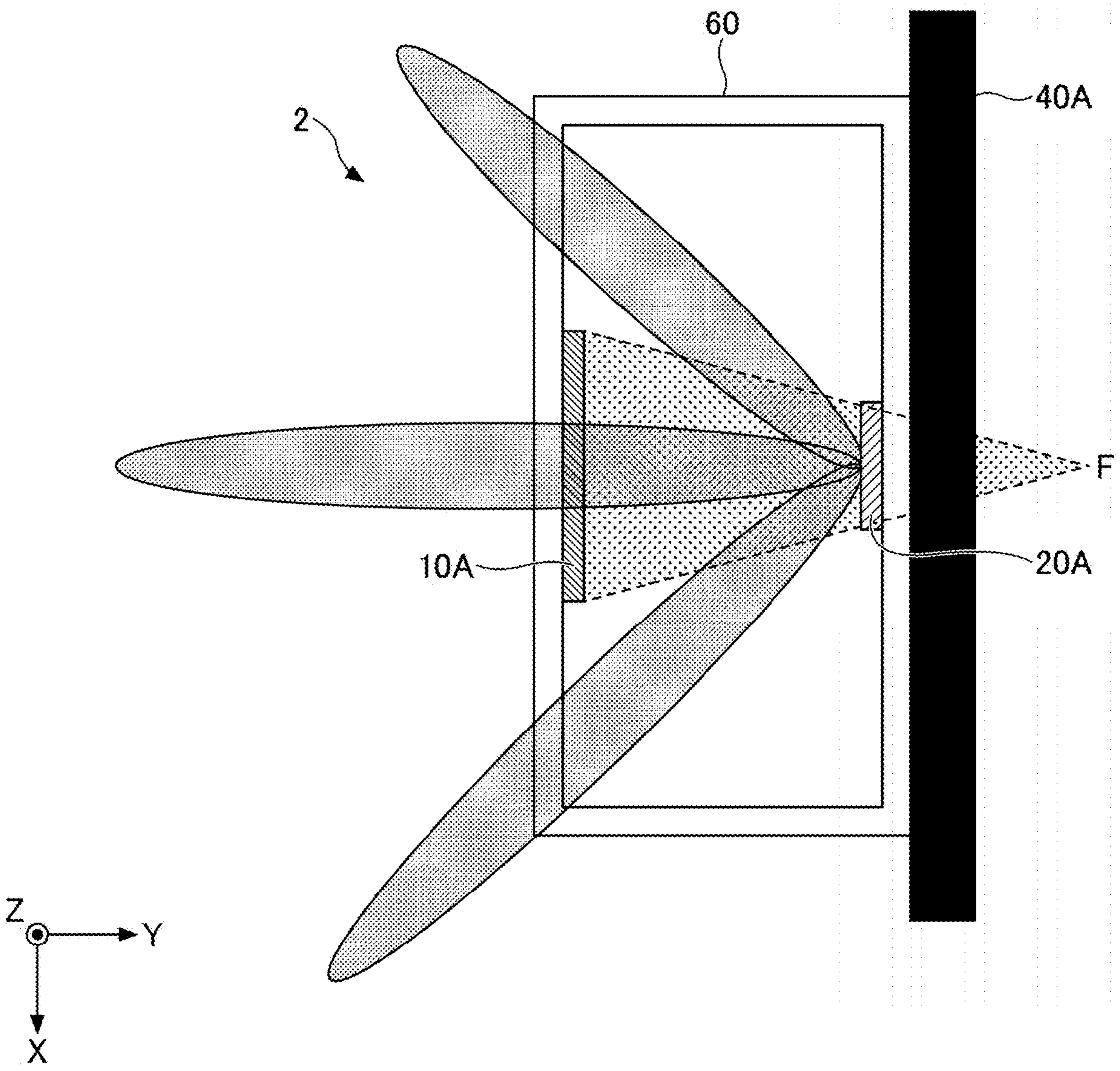
FIG. 23 is a diagram schematically illustrating an example of a radio wave control system according to a second embodiment of the present invention.

FIG. 23 is a diagram schematically illustrating a radio wave control system according to a second embodiment of the present invention. In the radio wave control system 2 according to the present embodiment, the phase adjustment plate 10A and the reflection plate 20A are provided in one case 60. Although not shown, the controller 50 is also housed in the case 60.

In the radio wave control system 2 according to the present embodiment, the reflection plate 20A is preferably provided in the vicinity of the focal point F of the phase adjustment plate 10A and in a predetermined range located closer to the phase adjustment plate 10A than the focal point in order to reduce the size of the system by housing the components in one case.

In the present embodiment, the case 60 is formed of any material that is transparent to electromagnetic waves at the operating frequency of the radio wave control system 2. As an example, the case 60 is made of a resin material such as an acrylic-based resin including polymethyl methacrylate, a cycloolefin-based resin, or a polycarbonate-based resin.

In the present embodiment, since the components are housed in one case 60, the radio wave control system 2 is movable, and the installation position thereof can be changed.

The radio wave control system 2 according to the present embodiment may be provided outdoors or indoors.

For example, in an area where high-rise buildings stand close together, a dead zone where radio waves do not normally reach is likely to occur. However, by providing the radio wave control system 2 according to the second embodiment outside the buildings, radio waves can be delivered to the outdoor dead zone, which contributes to reduction of the outdoor dead zone.

On the other hand, when the radio wave control system 2 according to the second embodiment is provided indoors, it is not necessary to attach the phase adjustment plate to the window glass, and only by attaching the integrated radio wave control system to an indoor wall, radio waves are transmitted to an indoor dead zone, which contributes to reduction of the indoor dead zone. In this case, the integrated radio wave control system 2 is preferably attached to a window or a wall facing an opening.

FIG. 23 illustrates the configuration in which all the components of the radio wave control system 2 are accommodated in the case 60. However, as a variation of the present embodiment, the back surface of the case 60 may be opened. In this configuration, when the radio wave control system 2 is mounted, the reflection plate is directly attached to the wall. In this configuration, since the back side of the case is opened, the thickness of the radio wave control system 2 can be further reduced.

Third Embodiment

In the first and second embodiments, the phase adjustment plate and the reflection plate are disposed to face each other. However, the phase adjustment plate and the reflection plate may not be disposed to face each other.

Figure 24:
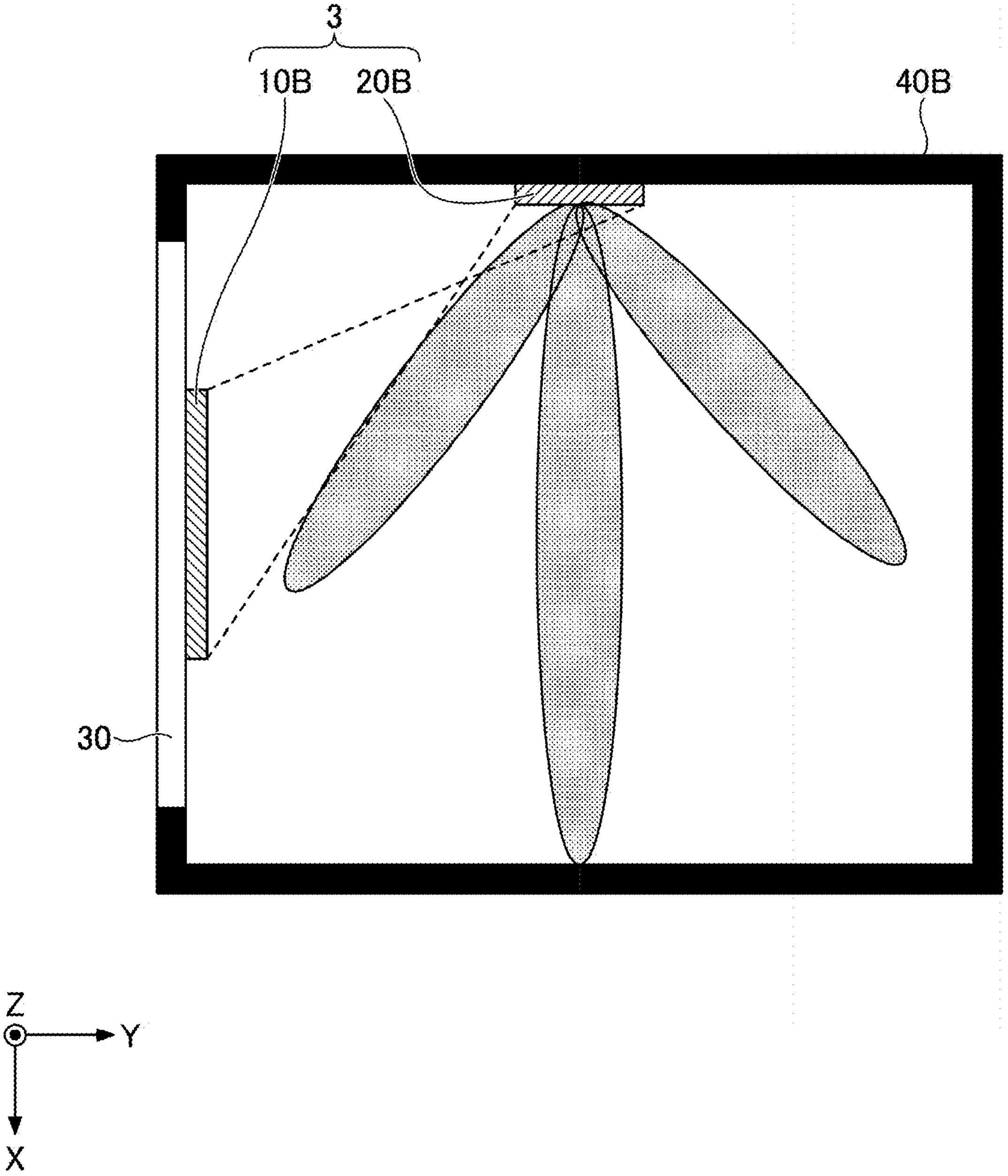
FIG. 24 is a top view schematically illustrating an example of a radio wave control system according to a third embodiment of the present invention.

FIG. 24 is a top view schematically illustrating a radio wave control system 3 according to a third embodiment of the present invention. In the present embodiment, by changing the design of the phase adjustment plate, the radio wave transmitted through the phase adjustment plate 10B is converged obliquely in the direction of the wall 40B adjacent to the glass plate 30 of the window glass at 90° in the horizontal direction.

Therefore, the reflection plate 20B of this configuration is disposed on a wall substantially perpendicular to the phase adjustment plate. Also in the radio wave control system of the present embodiment, the reflection plate 20B is disposed at the focal point of the phase adjustment plate 10B or in a predetermined range close to the focal point, so that the phase adjustment plate 10B collects power and the reflection plate 20B efficiently reflects radio waves in a desired direction. Thus, the phase adjustment plate 10B and the reflection plate 20B deliver radio waves to an indoor dead zone, and contribute to the reduction of the indoor dead zone. In the present embodiment, by disposing the components in this manner, it is possible to achieve the planarization of the system suitable for glass attachment and design.

Figure 25:
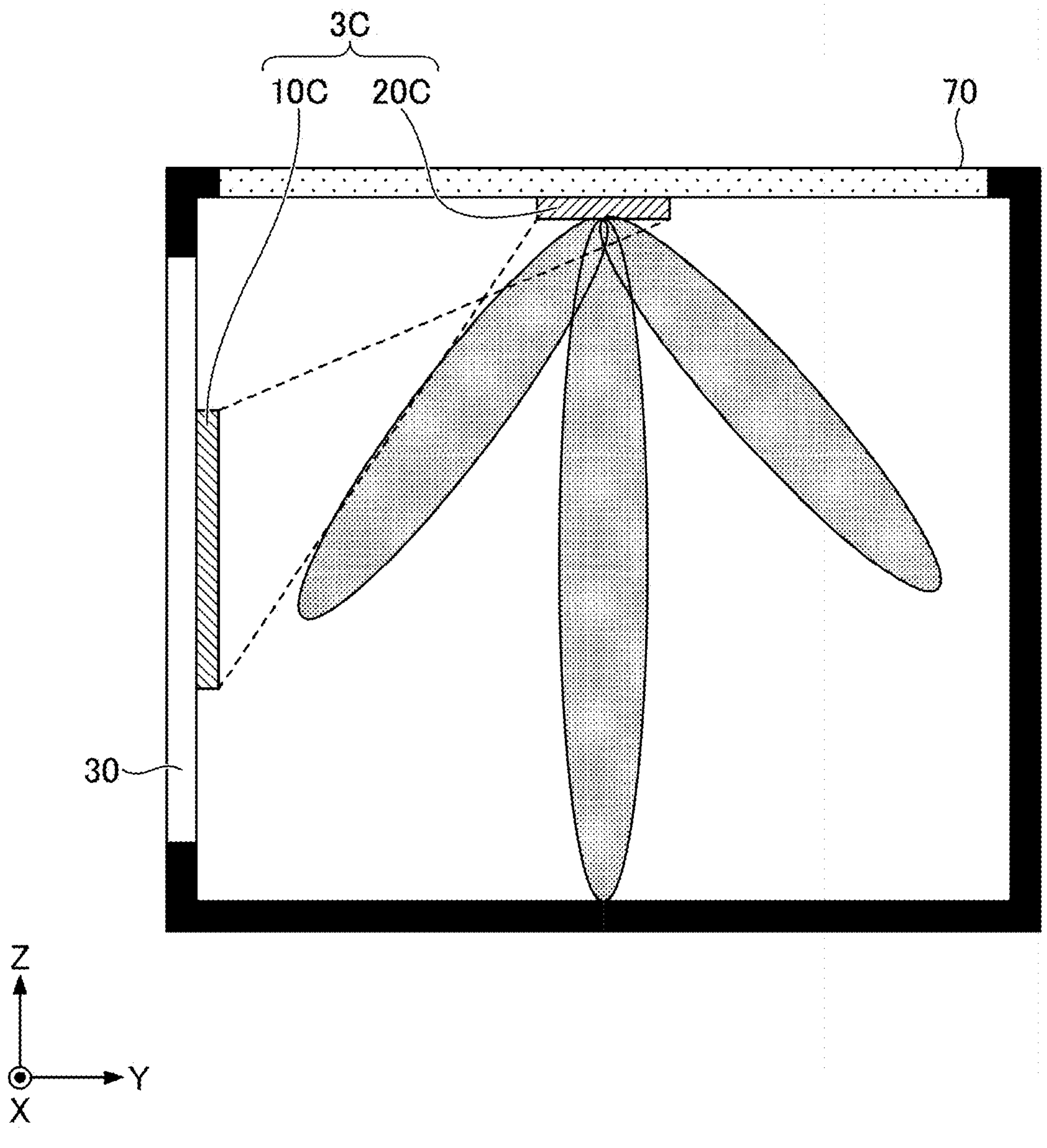
FIG. 25 is a side view schematically illustrating an example of a radio wave control system according to a variation of the third embodiment of the present invention.

FIG. 25 is a side view schematically illustrating a radio wave control system according to a variation of the third embodiment of the present invention. In this modified example, by changing the design of the phase adjustment plate, the radio wave transmitted through the phase adjustment plate 10C is converged obliquely in the direction of the ceiling adjacent to the glass plate of the window glass at 90° in the vertical direction.

Therefore, the reflection plate 20C of this configuration is disposed on the ceiling 70 which is substantially perpendicular to the phase adjustment plate 10C. Also in the radio wave control system of the present embodiment, the reflection plate 20C is disposed at the focal point of the phase adjustment plate 10C or in a predetermined range close to the focal point, so that the phase adjustment plate 10C collects electric power and the reflection plate 20C efficiently distributes radio waves in a desired direction from above. Thus, the phase adjustment plate and the reflection plate deliver the radio wave to the indoor dead zone to contribute to the reduction of the indoor dead zone.

FIG. 25 illustrates the example in which the reflection plate 20C is provided on the ceiling 70. However, the reflection plate may be disposed on the floor such that the radio wave transmitted through the phase adjustment plate 10C is obliquely converged toward the floor adjacent to the glass plate 30 of the window glass at 90° in the vertical direction.

In the third embodiment, FIGS. 24 and 25 illustrate the example in which the main surface of the phase adjustment plate and the main surface of the reflection plate are perpendicular to each other. However, the main surface of the phase adjustment plate and the main surface of the reflection plate may be in a positional relationship of an acute angle or an obtuse angle by adjusting the direction of the focal point of the phase adjustment plate.

Although not shown, as another variation of the third embodiment, in the same manner as in the second embodiment, the phase adjustment plate and the reflection plate may be accommodated in the same case, and the main surface of the phase adjustment plate and the main surface of the reflection plate may be arranged in a direction perpendicular to each other, or in a direction of an acute angle or an obtuse angle, so that power is collected by the phase adjustment plate and radio waves are reflected in a desired direction by the reflection plate.

As described above, the radio wave control system according to the exemplary embodiments of the present invention has been described. However, the present invention is not limited to the specifically disclosed embodiments, and various variations, modifications, substitutions, additions, deletions, and combinations can be made without departing from the scope of claims. They also of course fall within the technical scope of the present disclosure.

What is claimed is:

1. A radio wave control system comprising:

a phase adjustment plate that transmits a radio wave from a second main surface to a first main surface and focuses the radio wave on a focal point; and a reflection plate installed at a position irradiated with the radio wave transmitted through the phase adjustment plate, the reflection plate is installed at a position satisfying $$(P \times S)/(P0 \times S0) > 1,$$

where P is a value obtained by integrating power of the radio wave transmitted through the phase adjustment plate on the reflection plate, S is an area of a half-power plane on the reflection plate, P0 is a value obtained by integrating power of the radio wave transmitted through the phase adjustment plate on the reflection plate in a case where the phase adjustment plate is not provided, and S0 is an area of a half-power plane on the reflection plate in the case where the phase adjustment plate is not provided, and wherein the reflection plate is disposed at a position separated from the focal point of the phase adjustment plate by 7% or more of a focal length of the phase adjustment plate.

2. The radio wave control system according to claim 1, wherein the reflection plate is installed at a position where a power integral value of the radio wave on the reflection plate is larger than the power integral value of the radio wave on the reflection plate when the phase adjustment plate is not provided.

3. The radio wave control system according to claim 1, wherein in an electric power distribution of the radio wave on the reflection plate, an area of a region in which an electric power is more than or equal to a half-value of a maximum electric power is 50% or more of an area of the reflection plate.

4. The radio wave control system according to claim 1, wherein the reflection plate is disposed at a position other than the focal point of the phase adjustment plate, and the position other than the focal point is a position where an electric field intensity is less than 80% of a maximum value of the electric field intensity on an axis passing through a center of the phase adjustment plate and the focal point.

5. The radio wave control system according to claim 1, wherein the reflection plate is installed at a position satisfying $$Ave[|E|]/Ave[|E_f|] > 1,$$

where Ave[|E|] is a value obtained by averaging absolute values of electric field intensities of radio waves transmitted through the phase adjustment plate on the reflection plate, and Ave[$|E_f|$] is a value obtained by averaging absolute values of electric field intensities of radio waves on the reflection plate when the reflection plate is placed at the focal point.

6. The radio wave control system according to claim 5, wherein within a region on the reflection plate irradiated with the radio wave transmitted through the phase adjustment plate, a region, in which an electric power in an electric power distribution of the radio wave is more than or equal to a half-value of a maximum electric power, is a continuous region without a hole.

7. The radio wave control system according to claim 1, wherein reflection phase on a reflection surface of the reflection plate is changed for each location on the surface.

8. The radio wave control system according to claim 1, wherein the reflection plate is a reflection plate that reflects the radio wave at an angle other than specular reflection.

9. The radio wave control system according to claim 1, wherein a reflection angle of the reflection plate is electrically changeable.

10. The radio wave control system according to claim 1, wherein the reflection plate is installed on a wall or a ceiling.

11. The radio wave control system according to claim 1, wherein the phase adjustment plate and the reflection plate are provided in one case.

12. The radio wave control system according to claim 1, wherein the reflection plate has a quadrangle shape in which one side is 10λ or more and 40λ or less, λ being a wavelength of radio waves in air, or the reflection plate has a circular shape in which a diameter is 10λ or more and 50λ or less.

13. The radio wave control system according to claim 1, wherein a frequency band of the radio waves is 1 GHz to 300 GHz.

* * * * *